(12) United States Patent
Moore et al.

(10) Patent No.: US 9,578,307 B2
(45) Date of Patent: Feb. 21, 2017

(54) SMART NECKLACE WITH STEREO VISION AND ONBOARD PROCESSING

(71) Applicant: Toyota Motor Engineering & Manufacturing North America, Inc., Erlanger, KY (US)

(72) Inventors: Douglas A. Moore, Livermore, CA (US); Joseph M. A. Djugash, San Jose, CA (US); Yasuhiro Ota, Santa Clara, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 425 days.

(21) Appl. No.: 14/154,714

(22) Filed: Jan. 14, 2014

(65) Prior Publication Data

US 2015/0201181 A1 Jul. 16, 2015

(51) Int. Cl.
*H04N 13/02* (2006.01)
*G06F 3/01* (2006.01)
(Continued)

(52) U.S. Cl.
CPC .......... *H04N 13/0239* (2013.01); *A61H 3/061* (2013.01); *G06F 1/163* (2013.01); *G06F 3/016* (2013.01); *G06T 7/0075* (2013.01); A61H 2003/063 (2013.01); A61H 2201/165 (2013.01); A61H 2201/1609 (2013.01); A61H 2201/5007 (2013.01); A61H 2201/5043 (2013.01); A61H 2201/5048 (2013.01);
(Continued)

(58) Field of Classification Search
CPC ................... G06T 7/0075; G06T 2207/10021; G06F 1/163; A61H 3/061; H04N 2013/0092
See application file for complete search history.

(56) References Cited

U.S. PATENT DOCUMENTS 4,520,501 A  5/1985 DuBrucq
4,586,827 A  5/1986 Hirsch et al.
(Continued)

FOREIGN PATENT DOCUMENTS

CN  201260746  6/2009
CN  101527093  9/2009
(Continued)

OTHER PUBLICATIONS

The Nex Band; http://www.mightycast.com/#faq; May 19, 2015; 4 pages.
(Continued)

*Primary Examiner* — Richard Torrente
*Assistant Examiner* — Marnie Matt
(74) *Attorney, Agent, or Firm* — Snell & Wilmer LLP

(57) ABSTRACT

A wearable neck device for providing environmental awareness to a user, the wearable neck device includes a flexible tube. A first stereo pair of cameras is encased in a left portion of the flexible tube and a second stereo pair of cameras is encased in a right portion of the flexible tube. A vibration motor within the flexible tube provides haptic and audio feedback to the user. A processor in the flexible tube recognizes objects from the first stereo pair of cameras and the second stereo pair of cameras. The vibration motor provides haptic and audio feedback of the items or points of interest to the user.

18 Claims, 10 Drawing Sheets

(51) Int. Cl.
*A61H 3/06* (2006.01)
*G06F 1/16* (2006.01)
*G06T 7/00* (2006.01)
*H04N 13/00* (2006.01)

(52) U.S. Cl.
CPC ............... *A61H 2201/5058* (2013.01); *A61H 2201/5064* (2013.01); *A61H 2201/5071* (2013.01); *A61H 2201/5082* (2013.01); *A61H 2201/5084* (2013.01); *A61H 2201/5089* (2013.01); *A61H 2201/5092* (2013.01); *A61H 2201/5097* (2013.01); *G06T 2207/10021* (2013.01); *H04N 2013/0092* (2013.01)

(56) References Cited

U.S. PATENT DOCUMENTS

| | | |
|---|---|---|
| 5,047,952 A | 9/1991 | Kramer |
| 5,097,856 A | 3/1992 | Chi-Sheng |
| 5,129,716 A | 7/1992 | Holakovszky et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 * | 11/2009 | Daniel ............... A44C 5/0007 24/311 |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,743,145 B1 * | 6/2014 | Price ............... G06T 19/006 345/629 |
| 8,750,898 B2 | 6/2014 | Haney |
| 8,768,071 B2 | 7/2014 | Tsuchinaga et al. |
| 8,786,680 B2 * | 7/2014 | Shiratori ............... G06F 3/011 345/156 |
| 8,797,141 B2 | 8/2014 | Best et al. |
| 8,797,386 B2 | 8/2014 | Chou et al. |
| 8,803,699 B2 | 8/2014 | Foshee et al. |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| D727,194 S | 4/2015 | Wilson |
| 9,004,330 B2 | 4/2015 | White |
| 9,025,016 B2 | 5/2015 | Wexler et al. |
| 9,053,094 B2 | 6/2015 | Yassa |
| 9,076,450 B1 | 7/2015 | Sadek |
| 9,081,079 B2 | 7/2015 | Chao et al. |

(56) References Cited

U.S. PATENT DOCUMENTS

| | | |
|---|---|---|
| 9,081,385 B1 | 7/2015 | Ferguson |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,190,058 B2 | 11/2015 | Klein |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Arthur Hunter |
| 2003/0133008 A1* | 7/2003 | Stephenson .......... H04N 5/2251 348/47 |
| 2003/0133085 A1 | 7/2003 | Tretiakoff |
| 2003/0179133 A1 | 9/2003 | Pepin et al. |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2005/0259035 A1* | 11/2005 | Iwaki .................... G06F 3/011 345/8 |
| 2006/0004512 A1 | 1/2006 | Herbst |
| 2006/0028550 A1 | 2/2006 | Palmer |
| 2006/0029256 A1* | 2/2006 | Miyoshi ............... G06K 9/2036 382/104 |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1* | 7/2007 | Kim .................... A61B 1/00096 600/111 |
| 2007/0182812 A1* | 8/2007 | Ritchey ................ H04N 5/2254 348/36 |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0144854 A1* | 6/2008 | Abreu .................... G02C 3/003 381/74 |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0058611 A1* | 3/2009 | Kawamura ............ H04N 7/185 340/10.1 |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2010/0041378 A1 | 2/2010 | Aceves |
| 2010/0080418 A1* | 4/2010 | Ito ....................... G06K 9/00228 382/103 |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1* | 10/2010 | Wu ........................ H01R 31/06 439/502 |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0234584 A1* | 9/2011 | Endo ................... G02B 27/017 345/419 |
| 2011/0260681 A1* | 10/2011 | Guccione ............. H02J 7/0054 320/108 |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1* | 3/2012 | Azera .................... G06F 1/163 361/679.03 |
| 2012/0075168 A1 | 3/2012 | Osterhout et al. |
| 2012/0085377 A1 | 4/2012 | Trout |
| 2012/0092161 A1 | 4/2012 | West |
| 2012/0092460 A1* | 4/2012 | Mahoney ............ G06K 9/00664 348/46 |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0220234 A1* | 8/2012 | Abreu .................... G02C 3/003 455/41.2 |
| 2012/0232430 A1 | 9/2012 | Boissy et al. |
| 2012/0249797 A1 | 10/2012 | Haddick et al. |
| 2012/0252483 A1* | 10/2012 | Farmer ............... G01C 21/3602 455/456.1 |
| 2012/0316884 A1 | 12/2012 | Rozaieski et al. |
| 2012/0323485 A1 | 12/2012 | Mutoh |
| 2012/0327194 A1* | 12/2012 | Shiratori ................ G06F 3/011 348/47 |
| 2013/0002452 A1 | 1/2013 | Lauren |
| 2013/0044005 A1 | 2/2013 | Foshee et al. |
| 2013/0046541 A1 | 2/2013 | Klein et al. |
| 2013/0066636 A1 | 3/2013 | Singhal |
| 2013/0079061 A1 | 3/2013 | Jadhav |
| 2013/0115579 A1 | 5/2013 | Taghavi |
| 2013/0116559 A1* | 5/2013 | Levin ................... A61M 3/0279 600/437 |
| 2013/0127980 A1* | 5/2013 | Haddick ................ G06F 3/013 348/14.08 |
| 2013/0128051 A1 | 5/2013 | Velipasalar et al. |
| 2013/0131985 A1* | 5/2013 | Weiland ................ G01C 21/20 701/516 |
| 2013/0141576 A1 | 6/2013 | Lord et al. |
| 2013/0155474 A1 | 6/2013 | Roach et al. |

(56) References Cited

U.S. PATENT DOCUMENTS

| | | |
|---|---|---|
| 2013/0157230 A1 | 6/2013 | Morgan |
| 2013/0184982 A1 | 7/2013 | DeLuca |
| 2013/0202274 A1 | 8/2013 | Chan |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0245396 A1* | 9/2013 | Berman .............. G06F 19/3481 600/301 |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1* | 1/2014 | Vossoughi .......... H04M 1/0254 455/556.1 |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0055353 A1* | 2/2014 | Takahama ............... G06F 3/012 345/156 |
| 2014/0071234 A1* | 3/2014 | Millett ................... G01S 17/89 348/43 |
| 2014/0081631 A1 | 3/2014 | Zhu et al. |
| 2014/0085446 A1 | 3/2014 | Hicks |
| 2014/0098018 A1 | 4/2014 | Kim et al. |
| 2014/0100773 A1 | 4/2014 | Cunningham et al. |
| 2014/0125700 A1* | 5/2014 | Ramachandran ..... G06T 7/0065 345/633 |
| 2014/0132388 A1 | 5/2014 | Alalawi |
| 2014/0133290 A1 | 5/2014 | Yokoo |
| 2014/0160250 A1* | 6/2014 | Pomerantz ......... H04N 5/23229 348/47 |
| 2014/0184384 A1 | 7/2014 | Zhu et al. |
| 2014/0184775 A1* | 7/2014 | Drake ..................... A61B 3/14 348/78 |
| 2014/0222023 A1 | 8/2014 | Kim et al. |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379251 A1* | 12/2014 | Tolstedt ................ A61H 3/061 701/411 |
| 2014/0379336 A1 | 12/2014 | Bhatnagar |
| 2015/0002808 A1 | 1/2015 | Rizzo, III et al. |
| 2015/0016035 A1 | 1/2015 | Tussy |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0125831 A1 | 5/2015 | Chandrashekhar Nair et al. |
| 2015/0141085 A1 | 5/2015 | Nuovo et al. |
| 2015/0142891 A1 | 5/2015 | Haque |
| 2015/0154643 A1 | 6/2015 | Artman et al. |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0324646 A1* | 11/2015 | Kimia .................. G06T 7/0018 348/62 |
| 2015/0330787 A1 | 11/2015 | Cioffi et al. |
| 2015/0336276 A1 | 11/2015 | Song |
| 2015/0341591 A1 | 11/2015 | Kelder et al. |
| 2015/0346496 A1 | 12/2015 | Haddick et al. |
| 2015/0356837 A1 | 12/2015 | Pajestka |
| 2015/0364943 A1 | 12/2015 | Vick |
| 2015/0367176 A1 | 12/2015 | Bejestan |
| 2015/0375395 A1 | 12/2015 | Kwon |
| 2016/0007158 A1 | 1/2016 | Venkatraman |
| 2016/0028917 A1 | 1/2016 | Wexler |
| 2016/0042228 A1 | 2/2016 | Opalka |
| 2016/0098138 A1 | 4/2016 | Park |
| 2016/0156850 A1 | 6/2016 | Werblin et al. |
| 2016/0198319 A1 | 7/2016 | Huang |

FOREIGN PATENT DOCUMENTS

| | | | |
|---|---|---|---|
| CN | 201440733 | 4/2010 | |
| CN | 101803988 | 8/2010 | |
| CN | 101647745 | 1/2011 | |
| CN | 102316193 | 1/2012 | |
| CN | 102631280 | 8/2012 | |
| CN | 202547659 | 11/2012 | |
| CN | 202722736 | 2/2013 | |
| CN | 102323819 | 6/2013 | |
| CN | 103445920 | 12/2013 | |
| DE | 102011080056 | 1/2013 | |
| DE | 102012000587 | 7/2013 | |
| DE | 102012202614 | 8/2013 | |
| EP | 1174049 | 9/2004 | |
| EP | 1721237 | 11/2006 | |
| EP | 2368455 | 9/2011 | |
| EP | 2371339 | 10/2011 | |
| EP | 2127033 | 8/2012 | |
| EP | 2581856 | 4/2013 | |
| EP | 2751775 | 7/2016 | |
| FR | 2885251 | 11/2006 | |
| GB | 2401752 | 11/2004 | |
| JP | 1069539 | 3/1998 | |
| JP | 2001304908 | 10/2001 | |
| JP | 2010012529 | 1/2010 | |
| JP | 2010182193 | 8/2010 | |
| JP | 2013169611 | 9/2013 | |
| KR | 100405636 | 11/2003 | |
| KR | 20080080688 | 9/2008 | |
| KR | 20120020212 | 3/2012 | |
| KR | 1250929 | 4/2013 | |
| WO | WO 1995004440 | 2/1995 | |
| WO | WO 9949656 | 9/1999 | |
| WO | WO 0010073 | 2/2000 | |
| WO | WO 0038393 | 6/2000 | |
| WO | WO 0179956 | 10/2001 | |
| WO | WO 2004/076974 | 9/2004 | |
| WO | WO 2006/028354 | 3/2006 | |
| WO | WO 2006/045819 | 5/2006 | |
| WO | WO 2007/031782 | 3/2007 | |
| WO | WO 2008/008791 | 1/2008 | |
| WO | WO 2008015375 | 2/2008 | |
| WO | WO 2008/035993 | 3/2008 | |
| WO | WO 2008008791 A3 * | 4/2008 | .......... H04M 1/0254 |
| WO | WO 2008/096134 | 8/2008 | |
| WO | WO 2008127316 | 10/2008 | |
| WO | WO 2010/062481 | 6/2010 | |
| WO | WO 2010/109313 | 9/2010 | |
| WO | WO 2012/040703 | 3/2012 | |
| WO | WO 2012163675 | 12/2012 | |
| WO | WO 2013/045557 | 4/2013 | |
| WO | WO 2013/054257 | 4/2013 | |
| WO | WO 2013/067539 | 5/2013 | |

(56) References Cited

FOREIGN PATENT DOCUMENTS

| WO | WO 2013/147704 | 10/2013 |
| --- | --- | --- |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO 2015092533 | 6/2015 |
| WO | WO 2015108882 | 7/2015 |
| WO | WO 2015127062 | 8/2015 |

OTHER PUBLICATIONS

Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.

Bujacz et al.; "Remote Guidance for the Blind—A Proposed Teleassistance System and Navigation Trials"; Conference on Human System Interactions; May 25-27, 2008; 6 pages.

Rodriguez et al; "CrowdSight: Rapidly Prototyping Intelligent Visual Processing Apps"; AAAI Human Computation Workshop (HCOMP); 2011; 6 pages.

Chaudary et al.; "Alternative Navigation Assistance Aids for Visually Impaired Blind Persons"; Proceedings of ICEAPVI; Feb. 12-14, 2015; 5 pages.

Garaj et al.; "A System for Remote Sighted Guidance of Visually Impaired Pedestrians"; The British Journal of Visual Impairment; vol. 21, No. 2, 2003; 9 pages.

Coughlan et al.; "Crosswatch: A System for Providing Guidance to Visually Impaired Travelers at Traffic Intersections"; Journal of Assistive Technologies 7.2; 2013; 17 pages.

Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.

Paladugu et al.; "GoingEasy® with Crowdsourcing in the Web 2.0 World for Visually Impaired Users: Design and User Study"; Arizona State University; 8 pages.

Kammoun et al.; "Towards a Geographic Information System Facilitating Navigation of Visually Impaired Users"; Springer Berlin Heidelberg; 2012; 8 pages.

Bigham et al.; "Viz Wiz: Nearly Real-Time Answers to Visual Questions" Proceedings of the 23nd annual ACM symposium on User interface software and technology; 2010; 2 pages.

Guy et al; "CrossingGuard: Exploring Information Content in Navigation Aids for Visually Impaired Pedestrians" Proceedings of the SIGCHI Conference on Human Factors in Computing Systems; May 5-10, 2012; 10 pages.

Zhang et al.; "A Multiple Sensor-Based Shoe-Mounted User Interface Designed for Navigation Systems for the Visually Impaired"; 5th Annual ICST Wireless Internet Conference (WICON); Mar. 1-3, 2010; 9 pages.

Shoval et al.; "Navbelt and the Guidecane—Robotics-Based Obstacle-Avoidance Systems for the Blind and Visually Impaired"; IEEE Robotics & Automation Magazine, vol. 10, Issue 1; Mar. 2003; 12 pages.

Dowling et al.; "Intelligent Image Processing Constraints for Blind Mobility Facilitated Through Artificial Vision"; 8th Australian and NewZealand Intelligent Information Systems Conference (ANZIIS); Dec. 10-12, 2003; 7 pages.

Heyes, Tony; "The Sonic Pathfinder an Electronic Travel Aid for the Vision Impaired"; http://members.optuszoo.com.au/aheyew40/pa/pf_blerf.html; Dec. 11, 2014; 7 pages.

Lee et al.; "Adaptive Power Control of Obstacle Avoidance System Using Via Motion Context for Visually Impaired Person." International Conference on Cloud Computing and Social Networking (ICCCSN), Apr. 26-27, 2012 4 pages.

Wilson, Jeff, et al. "Swan: System for Wearable Audio Navigation"; 11th IEEE International Symposium on Wearable Computers; Oct. 11-13, 2007; 8 pages.

Borenstein et al.; "The GuideCane—A Computerized Travel Aid for the Active Guidance of Blind Pedestrians"; IEEE International Conference on Robotics and Automation; Apr. 21-27, 1997; 6 pages.

Bhatlawande et al.; "Way-finding Electronic Bracelet for Visually Impaired People"; IEEE Pointof-of-Care Healthcare Technologies (PHT), Jan. 16-18, 2013; 4 pages.

Blenkhorn et al.; "An Ultrasonic Mobility Device with Minimal Audio Feedback"; Center on Disabilities Technology and Persons with Disabilities Conference; Nov. 22, 1997; 5 pages.

Mann et al.; "Blind Navigation with a Wearable Range Camera and Vibrotactile Helmet"; 19th ACM International Conference on Multimedia; Nov. 28, 2011; 4 pages.

Shoval et al.; "The Navbelt—A Computerized Travel Aid for the Blind"; RESNA Conference, Jun. 12-17, 1993; 6 pages.

Kumar et al.; "An Electronic Travel Aid for Navigation of Visually Impaired Persons"; Communications Systems and Networks (COMSNETS), 2011 Third International Conference; Jan. 2011; 5 pages.

Pawar et al.; "Multitasking Stick for Indicating Safe Path to Visually Disable People"; IOSR Journal of Electronics and Communication Engineering (IOSR-JECE), vol. 10, Issue 3, Ver. II; May-Jun. 2015; 5 pages.

Pagliarini et al.; "Robotic Art for Wearable"; Proceedings of EUROSIAM: European Conference for the Applied Mathematics and Informatics 2010; 10 pages.

Greenberg et al.; "Finding Your Way: A Curriculum for Teaching and Using the Braillenote with Sendero GPS 2011"; California School for the Blind; 2011; 190 pages.

Helal et al.; "Drishti: An Integrated Navigation System for Visually Impaired and Disabled"; Fifth International Symposium on Wearable Computers; Oct. 8-9, 2001; 8 pages.

Parkes, Don; "Audio Tactile Systems for Designing and Learning Complex Environments as a Vision Impaired Person: Static and Dynamic Spatial Information Access"; EdTech-94 Proceedings; 1994; 8 pages.

Zeng et al.; "Audio-Haptic Browser for a Geographical Information System"; ICCHP 2010, Part II, LNCS 6180; Jul. 14-16, 2010; 8 pages.

AlZuhair et al.; "NFC Based Applications for Visually Impaired People—A Review"; IEEE International Conference on Multimedia and Expo Workshops (ICMEW), Jul. 14, 2014; 7 pages.

Graf, Christian; "Verbally Annotated Tactile Maps—Challenges and Approaches"; Spatial Cognition VII, vol. 6222; Aug. 15-19, 2010; 16 pages.

Hamid, Nazatul Naquiah Abd; "Facilitating Route Learning Using Interactive Audio-Tactile Maps for Blind and Visually Impaired People"; CHI 2013 Extended Abstracts; Apr. 27, 2013; 6 pages.

Ramya, et al.; "Voice Assisted Embedded Navigation System for the Visually Impaired"; International Journal of Computer Applications; vol. 64, No. 13, Feb. 2013; 7 pages.

Caperna et al.; "A Navigation and Object Location Device for the Blind"; Tech. rep. University of Maryland College Park; May 2009; 129 pages.

Burbey et al.; "Human Information Processing with the Personal Memex"; ISE 5604 Fall 2005; Dec. 6, 2005; 88 pages.

Ghiani, et al.; "Vibrotactile Feedback to Aid Blind Users of Mobile Guides"; Journal of Visual Languages and Computing 20; 2009; 13 pages.

Guerrero et al.; "An Indoor Navigation System for the Visually Impaired"; Sensors vol. 12, Issue 6; Jun. 13, 2012; 23 pages.

Nordin et al.; "Indoor Navigation and Localization for Visually Impaired People Using Weighted Topological Map"; Journal of Computer Science vol. 5, Issue 11; 2009; 7 pages.

Hesch et al.; "Design and Analysis of a Portable Indoor Localization Aid for the Visually Impaired"; International Journal of Robotics Research; vol. 29; Issue 11; Sep. 2010; 15 pgs.

Joseph et al.; "Visual Semantic Parameterization—To Enhance Blind User Perception for Indoor Navigation"; Multimedia and Expo Workshops (ICMEW), 2013 IEEE International Conference; Jul. 15, 2013; 7 pages.

Katz et al; "NAVIG: Augmented Reality Guidance System for the Visually Impaired"; Virtual Reality (2012) vol. 16; 2012; 17 pages.

(56) References Cited

OTHER PUBLICATIONS

Rodríguez et al.; "*Assisting the Visually Impaired: Obstacle Detection and Warning System by Acoustic Feedback*"; Sensors 2012; vol. 12; 21 pages.
Treuillet; "*Outdoor/Indoor Vision-Based Localization for Blind Pedestrian Navigation Assistance*"; WSPC/Instruction File; May 23, 2010; 16 pages.
Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.
Wang, et al.; "*Camera-Based Signage Detection and Recognition for Blind Persons*"; 13$^{th}$ International Conference (ICCHP) Part 2 Proceedings; Jul. 11-13, 2012; 9 pages.
Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.
Merino-Garcia, et al.; "*A Head-Mounted Device for Recognizing Text in Natural Sciences*"; CBDAR'11 Proceedings of the 4$^{th}$ International Conference on Camera-Based Document Analysis and Recognition; Sep. 22, 2011; 7 pages.
Yi, Chucai; "*Assistive Text Reading from Complex Background for Blind Persons*"; CBDAR'11 Proceedings of the 4$^{th}$ International Conference on Camera-Based Document Analysis and Recognition; Sep. 22, 2011; 7 pages.
Yang, et al.; "*Towards Automatic Sign Translation*"; The Interactive Systems Lab, Carnegie Mellon University; 2001; 5 pages.
Meijer, Dr. Peter B.L.; "*Mobile OCR, Face and Object Recognition for the Blind*"; The vOICe, www.seeingwithsound.com/ocr.htm; Apr. 18, 2014; 7 pages.
OMRON; Optical Character Recognition Sensor User's Manual; 2012; 450 pages.
Park, Sungwoo; "*Voice Stick*"; www.yankodesign.com/2008/08/21/voice-stick; Aug. 21, 2008; 4 pages.
Rentschler et al.; "*Intelligent Walkers for the Elderly: Performance and Safety Testing of VA-PAMAID Robotic Walker*"; Department of Veterans Affairs Journal of Rehabilitation Research and Development; vol. 40, No. 5; Sep./Oct. 2013; 9pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Glover et al.; "*A Robotically-Augmented Walker for Older Adults*"; Carnegie Mellon University, School of Computer Science; Aug. 1, 2003; 13 pages.
OrCam; www.orcam.com; Jul. 22, 2014; 3 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Graft, Birgit; "*An Adaptive Guidance System for Robotic Walking Aids*"; Journal of Computing and Information Technology—CIT 17; 2009; 12 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.
Kalra et al.; "*A Braille Writing Tutor to Combat Illiteracy in Developing Communities*"; Carnegie Mellon University Research Showcase, Robotics Institute; 2007; 10 pages.
Blaze Engineering; "*Visually Impaired Resource Guide: Assistive Technology for Students who use Braille*"; Braille 'n Speak Manual; http://www.blaize.com; Nov. 17, 2014; 5 pages.

AppleVis; *An Introduction to Braille Screen Input on iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15 2009; 7 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: the challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.
Ebay; Matin (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-Fu6zDa ; 4 pages.
Newegg; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
Newegg; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.
Lee et al.; "A Walking Guidance System for the Visually Impaired"; *International Journal of Pattern Recognition and Artificial Intelligence*; vol. 22; No. 6; pp. 1171-1186; 2008.
Ward et al.; "Visual Experiences in the Blind Induced by an Auditory Sensory Substitution Device"; *Journal of Consciousness and Cognition*; 30 pages; Oct. 2009.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS)*, 2013 1$^{st}$ International Conference; pp. 182-185; Sep. 13, 2013.
Aggarwal et al.; "All-in-One Companion for Visually Impaired;" *International Journal of Computer Applications*; vol. 79, No. 14; pp. 37-40; Oct. 2013.
"Light Detector" *EveryWare Technologies*; 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities*; vol. 13; pp. 5-12; 2015.
Mau et al.; "BlindAid: An Electronic Travel Aid for the Blind;" *The Robotics Institute Carnegie Mellon University*; 27 pages; May 2008.
Shidujaman et al.; "Design and navigation Prospective for Wireless Power Transmission Robot;" IEEE; Jun. 2015.

(56) References Cited

OTHER PUBLICATIONS

Wu et al. "Fusing Multi-Modal Features for Gesture Recognition", Proceedings of the 15$^{th}$ ACM on International Conference on Multimodal Interaction, Dec. 9, 2013, ACM, pp. 453-459.

Pitsikalis et al. "Multimodal Gesture Recognition via Multiple Hypotheses Rescoring", Journal of Machine Learning Research, Feb. 2015, pp. 255-284.

Shen et al. "Walkie-Markie: Indoor Pathway Mapping Made Easy" 10$^{th}$ USENIX Symposium on Networked Systems Design and Implementation (NSDI'13); pp. 85-98, 2013.

Tu et al. "Crowdsourced Routing II D2.6" 34 pages; 2012.

De Choudhury et al. "Automatic Construction of Travel Itineraries Using Social Breadcrumbs" pp. 35-44; Jun. 2010.

\* cited by examiner

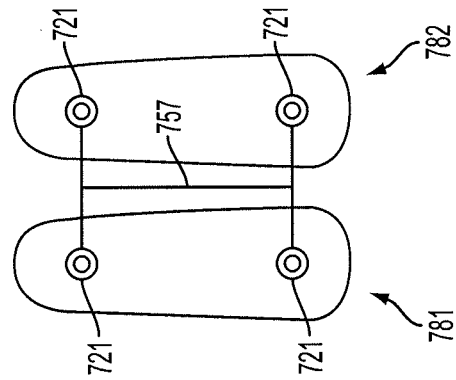
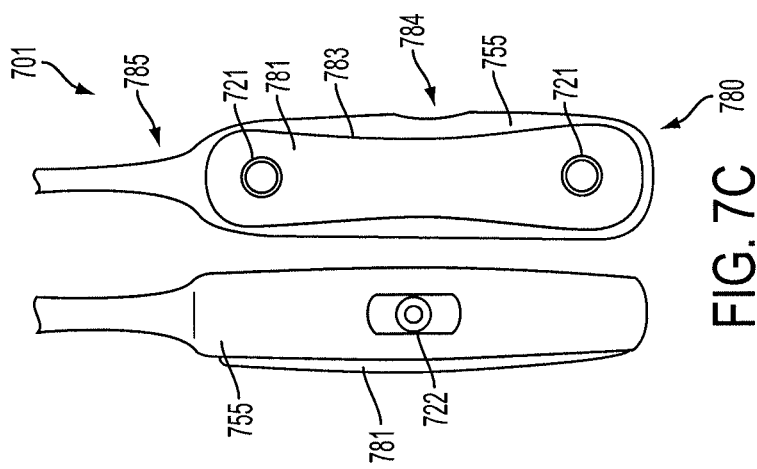

SMART NECKLACE WITH STEREO VISION AND ONBOARD PROCESSING

BACKGROUND

Field

The present disclosure relates to a wearable device, which provides haptic and audio feedback based on stereo camera input.

Description of the Related Art

Wearable cameras provide recording and documenting of a user's experience, often from the same or similar point of view or field of view (FOV) of the user. However, these devices are passive recorders, and do not provide real time processing and information about the scene in the FOV. Certain users, such as blind persons, may desire additional feedback relating to the environment. Other wearable cameras may be designed to assist blind persons. However, such devices lack stereo cameras for reliable depth perception information.

Thus, there is a need for an unobtrusive device which augments a user's environmental awareness with depth perception and object recognition.

SUMMARY

The present disclosure relates to a smart necklace which provides audio and haptic feedback based on stereo camera input. One aspect of the present disclosure is to provide a wearable device which can recognize objects for increased environmental awareness and obstacle avoidance. Another aspect of the present disclosure is to provide a wearable device which assists in navigation. Yet another aspect of the present disclosure is to provide a smart necklace for social interaction.

In one implementation, a wearable neck device for providing environmental awareness to a user comprises a flexible tube defining a cavity and having a center portion, a left portion and a right portion. A first stereo pair of cameras is positioned on the left portion of the flexible tube and a second stereo pair of cameras is positioned on the right portion of the flexible tube. A vibration unit is positioned within the cavity and configured to provide haptic and audio feedback to the user. A processor, also positioned within the cavity, is configured to receive video frames from the first stereo pair of cameras and the second stereo pair of cameras, provide object recognition of items in the video frames, identify points of interest to the user based on the object recognition, and control the vibration unit to provide haptic and audio feedback to the user based on the points of interest.

In another implementation, a wearable neck device for providing environmental awareness to a user comprises a band defining a cavity and having a center portion, a left portion and a right portion. A first stereo pair of cameras is positioned on the left portion of the band and a first camera is positioned to a side of the first stereo pair of cameras. A second stereo pair of cameras is positioned on the right portion of the band and a second camera is positioned to a side of the second stereo pair of cameras. A vibration unit, positioned within the cavity, is configured to provide haptic and audio feedback to the user. A processor, also positioned within the cavity, is configured to receive video frames from the first stereo pair of cameras, the first camera, the second stereo pair of cameras and the second camera, provide object recognition of items in the video frames, identify points of interest to the user based on the object recognition, and control the vibration unit to provide haptic and audio feedback to the user based on the points of interest.

In yet another implementation, a method of navigation using a wearable neck device comprises recognizing objects with a stereo pair of cameras of the wearable neck device, determining a location of the wearable neck device with respect to the objects, determining a route to a destination that avoids the objects, providing a first audio or haptic cue indicating the route, and providing a second audio or haptic cue when the wearable neck device reaches the destination.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 7C is a close-up view of a paddle of the smart necklace in FIG. 7A;

FIG. 7D is a close-up view of detachable pucks of the smart necklace in FIG. 7A;

DETAILED DESCRIPTION

Apparatus, systems and methods that implement the implementations of the various features of the present application will now be described with reference to the drawings. The drawings and the associated descriptions are provided to illustrate some implementations of the present application and not to limit the scope of the present application. Throughout the drawings, reference numbers are re-used to indicate correspondence between referenced elements.

Figure 1:
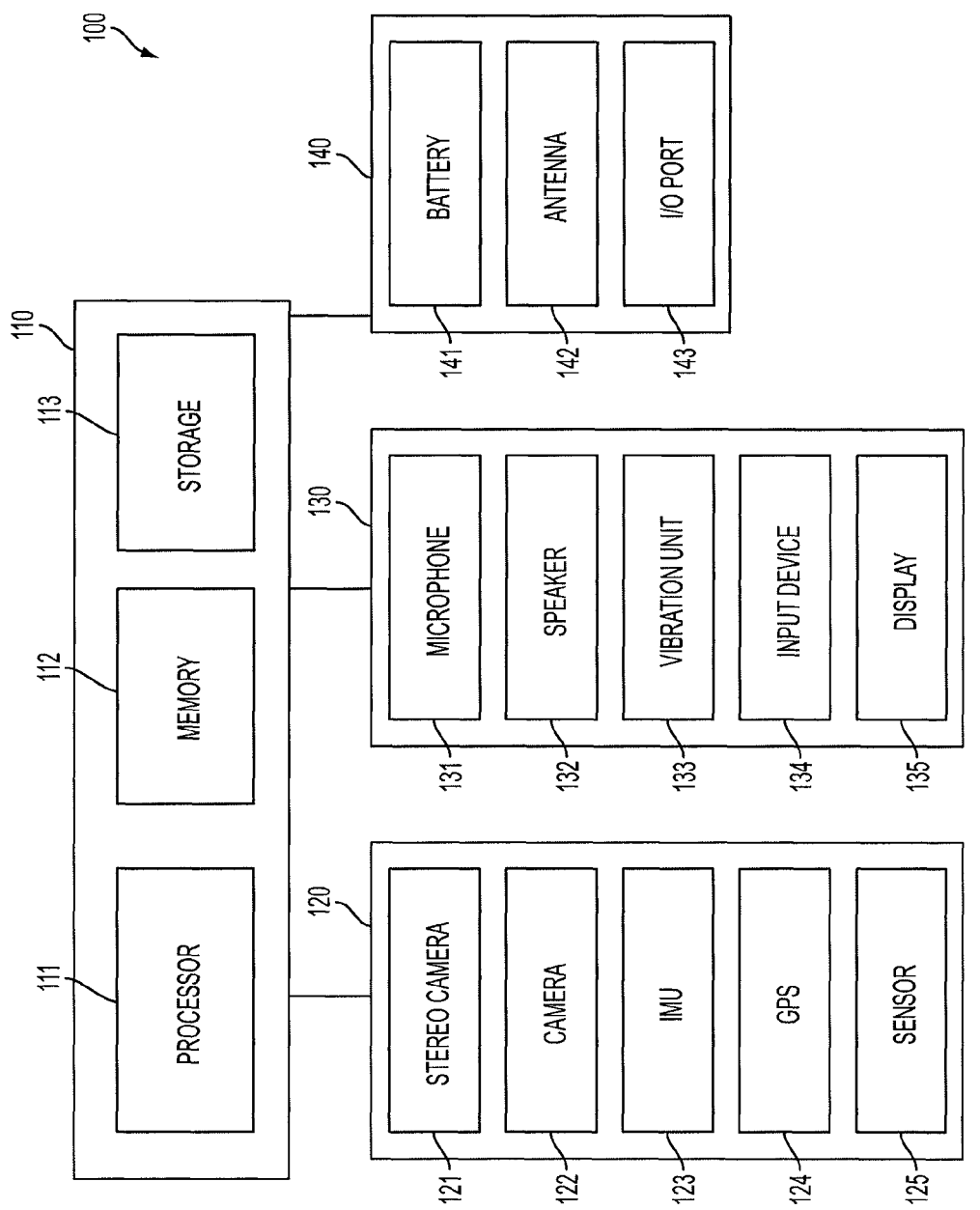
FIG. 1 is a block diagram of a smart necklace according to an implementation of the present disclosure.

In one implementation, a smart necklace 100 includes an onboard processing array 110, which communicates with a sensor array 120, an interface array 130, and a component array 140. The onboard processing array 110, the sensor array 120, the interface array 130, and the component array 140 are exemplary groupings to visually organize the components of the smart necklace 100 in the block diagram of FIG. 1 and are not limiting or necessarily representative of any physical groupings. In addition, certain implementations may have more or less components shown in FIG. 1.

The onboard processing array 110 includes a processor 111, a memory 112, and a storage 113. The processor 111 may be a computer processor such as an ARM processor, DSP processor, distributed processor, or other form of central processing. The memory 112 may be a RAM or other volatile or nonvolatile memory used by the processor 111. The storage 113 may be a non-transitory memory or a data storage device, such as a hard disk drive, a solid state disk drive, a hybrid disk drive, or other appropriate data storage, and may further store machine-readable instructions, which may be loaded into the memory 112 and executed by the processor 111.

The sensor array 120 includes a stereo camera 121, a camera 122, an inertial measurement unit (IMU) 123, a global positioning system (GPS) 124, and a sensor 125. The stereo camera 121 may be a stereo camera comprising two cameras offset by a stereo distance. The stereo distance may be optimized for the two cameras. The smart necklace 100 may have more than one stereo camera 121, as will be further described below. The camera 122 may be a camera or other optical sensor not part of a stereo camera pair. The IMU 123 may be an IMU which may further comprise one or more of an accelerometer, a gyroscope, and/or a magnetometer. The GPS 124 may be one or more GPS units. The sensor 125 may be one or more sensors which provide further information about the environment in conjunction with the rest of the sensor array 120. The sensor 125 may be, for example, one or more of a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, or other sensor.

The interface array 130 includes a microphone 131, a speaker 132, a vibration unit 133, an input device 134, and a display 135. The microphone 131 may be a microphone or other device capable of receiving sounds, such as voice activation/commands or other voice actions from the user, and may be integrated with or external to the smart necklace 100. The speaker 132 may be one or more speakers or other devices capable of producing sounds and/or vibrations. The vibration unit 133 may be a vibration motor or actuator capable of providing haptic and tactile output. In certain implementations, the vibration unit 133 may also be capable of producing sounds, such that the speaker 132 and the vibration unit 133 may be the same or integrated. The input device 134 may be an input device such as a touch sensor and/or one or more buttons. For example, the input device 134 may be a touch sensor used as a slider to adjust settings as well as act as a button for making selections, similar to a touchpad. The display 135 may be a display, integrated into the smart necklace 100 or wirelessly connected to the smart necklace 100, and may be capable of displaying visual data from the stereo camera 121 and/or the camera 122. In other implementations, the display 135 may be another visual alert device, such as one or more LEDs or similar light source.

The component array 140 includes a battery 141, an antenna 142, and an input/output (I/O) port 143. The battery 141 may be a battery or other power supply capable of powering the smart necklace 100. The battery 141 may have a connection port for recharging, or may be wirelessly recharged, such as through induction charging. The antenna 142 may be one or more antennas capable of transmitting and receiving wireless communications. For example, the antenna 142 may be a Bluetooth or WiFi antenna, may be a radio frequency identification (RFID) antenna or reader, and/or a near field communication (NFC) unit. The I/O port 143 may be one or more ports for connecting additional peripherals. For example, the I/O port 143 may be a headphone jack, or may be a data port. The antenna 142 and/or the I/O port 143 allows the smart necklace 100 to connect to another device or network for data downloads, such as updates or map information or other relevant information for a particular application, and data uploads, such as status updates. Further, the antenna 142 and/or the I/O port 143 allows the smart necklace 100 to communicate with other smart necklaces 100 for distributed computing or sharing resources. The smart necklace 100 described herein is generally a stand-alone device. However, in other implementations, the smart necklace 100 may be configured or optimized to work in conjunction with other devices. For example, smartphones, tablets, or other mobile devices may wirelessly connect to the smart necklace 100 for shared resources and processing. The mobile device may act as a display unit for the smart necklace 100. The smart necklace 100 may further have specific protocols for interacting with mobile devices or other smart necklaces 100.

The smart necklace 100 is a lightweight, wearable smart device that is worn around the user's neck for environmental awareness, navigation, social interactions, and obstacle avoidance through real-time feedback. The smart necklace 100 is capable of recognizing objects around the user, in order to alert the user. For example, the smart necklace 100 may be used by a blind person to aid in environmental awareness and navigate safely around obstacles. The smart necklace 100 provides the user audio and haptic feedback through the speaker 132 and the vibration unit 133 based upon camera input from the stereo camera 121 and the camera 122.

In one implementation, the smart necklace 100 includes two pairs of stereo cameras 121, which may be positioned on either side of the user's neck. Stereo cameras provide depth information in both indoor and outdoor environments. The stereo cameras 121 may face forward, in front of a user, to establish a field of view (FOV). The stereo cameras 121 may have, for example, an FOV of around 90 degrees. The stereo cameras 121 provide 3D information such as depth in front of the user. Additional cameras 122, which may be placed to the sides of the stereo cameras 121, may increase the FOV to, for example, around 120 degrees. Alternatively, the cameras 122 may be placed where needed, such as behind the user's neck. Although the cameras 122 may be monocular, they can provide simple recognition, even without depth or distance information. For example, the cameras 122 can detect moving objects in the user's periphery. The stereo cameras 121 and the cameras 122 continuously passively recognize objects in the environment. Working in conjunction with the other sensors in the sensor array 120, the smart necklace 100 provides the user with guidance and navigation commands by way of audio and haptic feedback.

The GPS 124 provides location information, which works with the inertial guidance information, including velocity and orientation information, provided by the IMU 123 to help direct the user. The memory 112 and/or the storage 113 may store, for example, map information or data to help locate and provide navigation commands to the user. The map data may be preloaded, downloaded wirelessly through the antenna 142, or may be visually determined, such as by capturing a building map posted near a building's entrance, or built from previous encounters and recordings. The map data may be abstract, such as a network diagram with edges, or a series of coordinates with features. The map data may contain points of interest to the user, and as the user walks, the stereo cameras 121 and/or cameras 122 may passively recognize additional points of interest and update the map data. For example, the user may give a voice command, "Take me to building X in Y campus." The smart necklace 100 may then download a relevant map if not already stored, or may navigate based on perceived images from the stereo cameras 121 and the cameras 122. As the user follows the navigation commands from the smart necklace 100, the user may walk by a coffee shop in the morning, and the smart necklace 100 would recognize the coffee shop and the time of day, along with the user's habits, and appropriately alert the user. The smart necklace 100 may verbally alert the user through the speakers 132. The user may use the input device 134 to adjust settings, which for example may control the types of alerts, what details to announce, and other parameters which may relate to object recognition or alert settings. The user may turn on or off certain features as needed.

When navigating indoors, the standalone GPS units may not provide enough information to a blind user to navigate around obstacles and reach desired locations or features. The smart necklace 100 may recognize, for instance, stairs, exits, and restrooms and appropriately store them in the memory 112 and/or the storage 113. In another example, the smart necklace 100 may determine empty seats for the user to navigate to, or may remember the user's specific seat in order to navigate away and subsequently return to the same seat. Other points of interest may be potential hazards, descriptions of surrounding structures, alternate routes, and other locations. Additional data and points of interest can be downloaded and/or uploaded to mobile devices and other devices, social networks, or the cloud, through Bluetooth or other wireless networks. With wireless connectivity, local processing can be reduced, as high level information may be available from the cloud or other remote data centers.

The smart necklace 100 may determine paths for navigation, which may be further modified for the user's needs. For example, a blind person may prefer routes that follow walls. Using the IMU 123 and/or the GPS 124 and other sensors, the smart necklace 100 can determine the user's location and orientation to guide them along the path, avoiding obstacles. The vibration unit 133 and the speaker 132 provide audio and haptic cues to help guide the user along the path. For example, the speaker 132 may play a command to move forward a specified distance. Then, special audio tones or audio patterns can play when the user is at a waypoint, and guide the user to make a turn through additional tones or audio patterns. A first tone, audio pattern or vibration can alert the user to the start of a turn, such as a single tone or a vibration from the left side of the smart necklace may indicate a left turn. A second tone, audio pattern or vibration can alert the user that the turn is complete such as two tones, or the vibration may stop, such as the left side ceases to vibrate when the turn is complete. Different tones or patterns may also signify different degrees of turns, such as a specific tone for a 45 degree turn and a specific tone for a 90 degree turn. Alternatively or in addition to tones and vibrations, the smart necklace 100 may provide verbal cues, similar to a car GPS navigation command. High level alerts may also be provided through audio feedback. For example, as the smart necklace 100 reaches a predetermined distance—such as a foot or other value which may be stored in the memory 112 and/or the storage 113 and may be adjusted—from an obstacle or hazard, the speaker 132 and/or the vibration unit 133 may provide audible alerts. As the smart necklace 100 gets closer to the obstacle, the audible alerts may increase in intensity or frequency.

The microphone 131 may provide additional environmental data, such as sounds of moving cars or other possible hazards. The microphone 131 may work in conjunction with the speaker 132, and may be placed away from the speaker 132 to prevent interference. The microphone 131 may alternatively work in conjunction with an attached audio device, such as bone conduction devices, to provide the user with audio feedback without broadcasting the audio feedback.

The smart necklace 100 may improve social interactions. For example, the smart necklace 100 may recognize faces in a room to identify potential friends, and provide the user with audio feedback identifying friends. The stereo cameras 121 and/or the camera 122 may be further able to determine additional details about persons, such as moods or expressions, or if they are engaging in physical activities, in order to alert the user. For example, the potential friend may extend a hand for a handshake or a "high five," and the smart necklace 100 may use audio or haptic feedback to notify the user. The microphone 131 may recognize voices of other persons to identify and appropriately notify the user, or may recognize a new voice to save for future identification.

Although the smart necklace 100 is described with respect to a blind user, the smart necklace 100 may be used in other applications. For example, the smart necklace 100 may be used by peace officers and law enforcement officers as a recorder which provides additional environmental awareness. The smart necklace 100 may be further used by athletes to record sports in a real-time, first person view. For example, performing certain actions such as a swing can be recorded, including inertial motions, to analyze the motions. The smart necklace 100 may also be used in hazardous environments to provide additional safety warnings. For example, the smart necklace 100 may be used in a factory to provide a factory worker additional warning about possible hazardous conditions or obstacles. In such applications, the sensor 125 may be specifically chosen to provide particularly relevant measurements. For instance, in an environment with harmful gas, the sensor 125 may detect dangerous levels of gas and accordingly alert the user. The sensor 125 may provide low-light viewing, or the stereo cameras 121 and/or the camera 122 may be capable of night vision, to provide the user with additional environmental awareness in low-light conditions, such as outdoors at night or photosensitive environments. The smart necklace 100 can be a memory device to aid persons, such as Alzheimer's patients. The smart necklace 100 can aid in shopping or otherwise navigating inventories by helping to keep track of goods. The antenna 142 may be an RFID or NFC reader capable of identifying RFID or NFC tags on goods.

Figure 2:
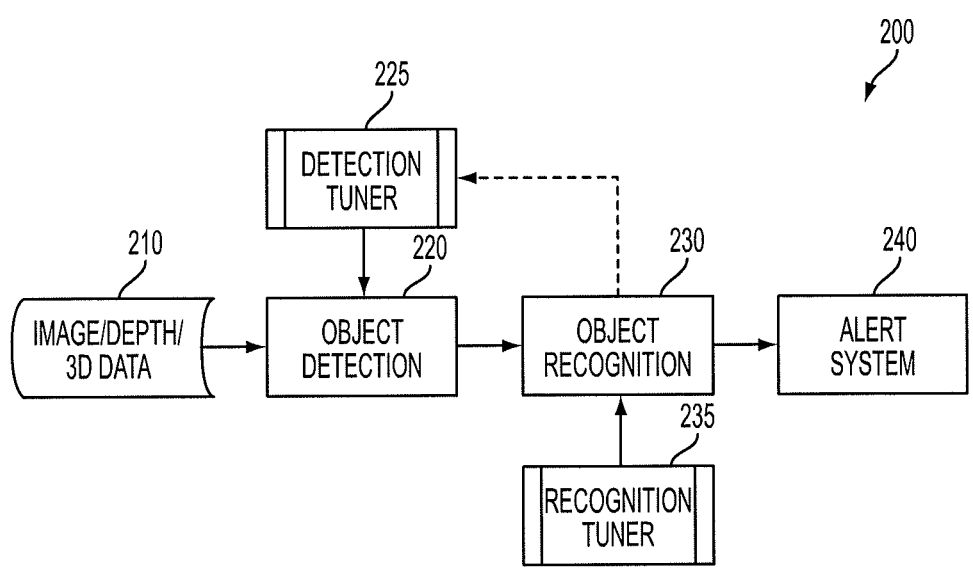
FIG. 2 is a flowchart of an object recognition logic according to an implementation of the present disclosure.

Referring now to FIG. 2, a flowchart of a method 200 of adjusting object detection parameters, object recognition parameters, or both object detection parameters and object recognition parameters is schematically depicted. In some implementations, the method 200 may be implemented as logic within the machine readable instructions that, when executed by the processor 111, automatically adjust object detection parameters, object recognition parameters, or both object detection parameters and object recognition parameters. It is noted that, while the method 200 depicts a specific sequence, additional implementations of the present disclosure are not limited to any particular sequence.

Referring now to FIG. 2, at block 210 the smart necklace 100 receives image data representative of the environment. As noted above, in some implementations, the smart necklace 100 is configured to acquire video or image data, which may be video frames, of the FOV of the user from the stereo cameras 121 and the cameras 122, and to then send the acquired image data of the environment to the processor 111 and/or the memory 112 and storage 113 for storage and/or processing. In some implementations, the smart necklace 100 may receive image data from a source external to the smart necklace 100, such as via the antenna 142 through a wireless network.

The image data received at block 210 may be data of a variety of forms, such as, but not limited to red-green-blue ("RGB") data, depth image data, three dimensional ("3D") point data, and the like. In some implementations, the smart necklace 100 may receive depth image data from an infrared sensor or other depth sensor, such as an infrared sensor or depth sensor integrated with the stereo camera 121 and/or the camera 122. In other implementations that include a depth sensor (e.g., an infrared sensor), the depth sensor may be separate from the stereo camera 121 and/or the camera 122.

Still referring to FIG. 2, at block 220, the machine readable instructions stored in the memory 112, when executed by the processor 111, cause the smart necklace 100 to detect a candidate object, with the onboard processing array 110, based on the image data received at block 210. In some implementations, the onboard processing array 110 may detect the candidate object by identifying a candidate region of the received image data, such as a region of the image that includes high entropy. For example, the onboard processing array 110 may detect a high entropy region in the acquired target image data that includes a spray bottle. In some implementations, the onboard processing array 110 may utilize a sliding window algorithm to identify the candidate region of the received image data. In implementations, the onboard processing array 110 may detect the candidate object by utilizing a feature descriptor algorithm or an image descriptor algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some implementations, the onboard processing array 110 may bias detections to one or more spatially located regions of interest based on application, scene geometry and/or prior information.

The onboard processing array 110 includes at least one object detection parameter to facilitate the detection of the candidate object. In some implementations, the at least one object detection parameter is a window size, a noise filtering parameter, an estimated amount of light, an estimated noise level, a feature descriptor parameter, an image descriptor parameter, or the like.

Still referring to FIG. 2, at block 230, the machine readable instructions stored in the memory 112, when executed by the processor 111, cause the smart necklace 100 to recognize an object, with the onboard processing array 110, based on the image data received at block 210. In some implementations, the object recognition module may recognize the object based on a candidate region identified by the onboard processing array 110.

In some implementations, the onboard processing array 110 may recognize the candidate object by utilizing a feature descriptor algorithm or an image descriptor algorithm, such as scale invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. In some implementations in which the onboard processing array 110 utilizes a feature descriptor or image descriptor algorithm, the onboard processing array 110 may extract a set of features from a candidate region identified by the onboard processing array 110. The onboard processing array 110 may then access a reference set of features of an object recognition reference model from an object recognition database stored in the memory 112 or the storage 113 and then compare the extracted set of features with the reference set of features of the object recognition reference model. For example, the onboard processing array 110 may extract a set of features from the high entropy region of the acquired target image data that includes a bottle and compare the extracted set of features to reference sets of features for one or more reference bottle models. When the extracted set of features match the reference set of features, the onboard processing array 110 may recognize an object (e.g., recognizing a bottle when the extracted set of features from the high entropy region of the acquired target image data that includes the bottle match the reference set of features for a reference bottle model). When the extracted set of features does not match the reference set of features, an object recognition error has occurred (e.g., an object recognition error indicating that no object recognition reference model matches the candidate object). When an object recognition error has occurred (e.g., referring to the example, no reference bottle model exists in the memory 112 or the storage 113), the at least one object detection parameter may be adjusted to improve the accuracy of the object detection module, as described below with reference to block 225.

In some implementations, the object recognition module may assign an identifier to the recognized object. For example, the identifier may be an object category identifier (e.g., "bottle" when the extracted set of features match the reference set of features for the "bottle category" or "cup" when the extracted set of features match the reference set of features for the "cup" object category) or a specific object instance identifier (e.g., "my bottle" when the extracted set of features match the reference set of features for the specific "my bottle" object instance or "my cup" when the extracted set of features match the reference set of features for the specific "my cup" object instance).

The onboard processing array 110 includes at least one object recognition parameter to facilitate the recognition of the object. In some implementation, the at least one object recognition parameter is a window size, a noise filtering parameter, an estimated amount of light, an estimated noise level, a feature descriptor parameter, an image descriptor parameter, or the like.

Still referring to FIG. 2, at block 240, the machine readable instructions stored in the memory 112, when executed by the processor 111, cause the smart necklace 100 to send control signals to the vibration unit 133 and/or the speaker 132 to provide appropriate haptic and audio feedback to the user. For example, if the object recognized is categorized as an obstacle, the vibration unit 133 may vibrate at an increasing rate as the smart necklace approaches it. If the object is categorized as a hazard, the speaker 132 may play a warning sound. If the object is categorized as a point of interest, the speaker 132 may play an appropriate notice, or may remain silent. As noted above, when an object recognition error has occurred, the at least one object detection parameter may be adjusted to improve the accuracy of the onboard processing array 110.

Still referring to FIG. 2, at block 225, the machine readable instructions stored in the memory 112, when executed by the processor 111, cause the smart necklace 100 to adjust at least one object detection parameter of the onboard processing array 110, with a detection tuner module, when an object recognition error has occurred. The detection tuner module may be implemented as instructions executed by the processor 111 and data stored on the memory 112 and/or the storage 113. By way of non-limiting example, in some implementations, the detection tuner module may adjust the window size utilized by the onboard processing array 110 when an object recognition error has occurred. In some implementations, the detection tuner module includes a detection tuner model and the detection tuner model adjusts the at least one object detection parameter based on the object recognition error. In some implementations, the detection tuner model maps the object recognition error to the adjusted at least one object detection parameter. In some implementations, the detection tuner model is a learned correlation model, such as a support vector machine ("SVM") model.

Still referring to FIG. 2, at block 235, the machine readable instructions stored in the memory 112, when executed by the processor 111, cause the smart necklace 100 to adjust at least one object recognition parameter of the onboard processing array 110, with a recognition tuner module, when object recognition error has occurred. The recognition tuner module may be implemented as instructions executed by the processor 111 and data stored on the memory 112 and/or the storage 113. By way of non-limiting example, in some implementations, the recognition tuner module may adjust the window size utilized by the onboard processing array 110 when object recognition error has occurred. In some implementations, the recognition tuner module includes a recognition tuner model and the recognition tuner model adjusts the at least one object recognition parameter based on the object recognition error. In some implementations, the recognition tuner model maps the object recognition error to the adjusted at least one object recognition parameter. In some implementations, the recognition tuner model is a learned correlation model, such as a support vector machine ("SVM") model.

Figure 3B:
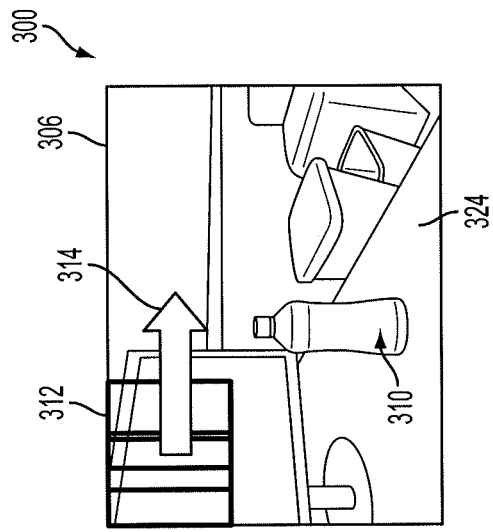
FIG. 3B further illustrates the object recognition logic shown in FIG. 3A.
Figure 3C:
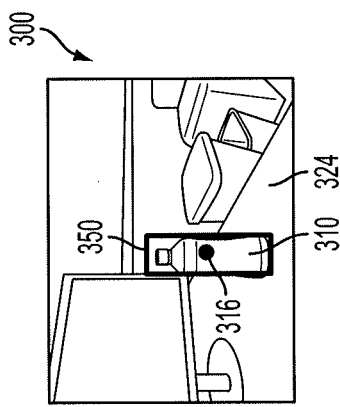
FIG. 3C further illustrates the object recognition logic shown in FIG. 3A.
Figure 3A:
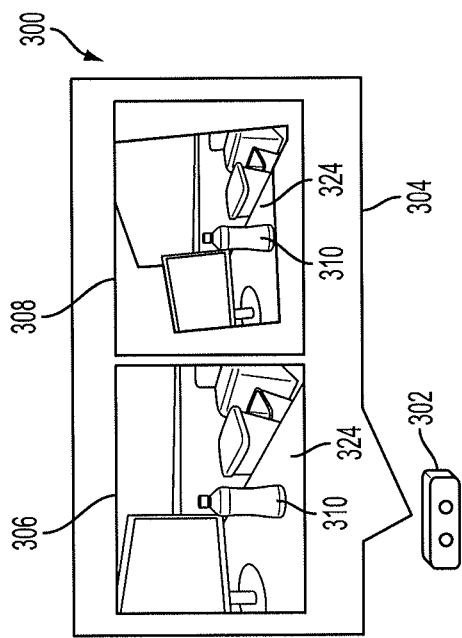
FIG. 3A illustrates an object recognition logic applied to a visual data set according to an implementation of the present disclosure.

Referring now to FIGS. 3A-3C, FIGS. 3A-3C present one example of a method of object recognition according to an implementation of the present disclosure. In FIG. 3A, for example, the first visual data 306 corresponds to a 2-D image of the target object 310 positioned on a plane 324 (e.g., a table). The second visual data 308 corresponds to 3-D depth data of the target object 310 positioned on the plane 324. Category object recognition is performed for analyzing, using the processor 111 and the first visual data 306. The first visual data 306 is analyzed based on a plurality of object models stored in a database, which may be stored in the storage 113. For example, the plurality of object models may include primitive shapes such as cylinders, boxes, and the like associated with corresponding parameters defining the primitive shapes. For example, the processor 111 may determine whether any portion of the first visual data 306 corresponds in shape, structure, or in terms of other pose information, to the plurality of object models stored in the database. Each of the plurality of object models may have at least one parameter. For example, an object model may be a cylinder with parameters of a height and a radius. For example, an object model may be a box with three parameters of a width, a height, and a length.

When the processor 111 searches for an object model of the plurality of object models, more than one object model may be similar in shape or structure to a portion of the first visual data 306. For example, a body of a bottle (e.g., the target object 310) may be similar in shape or structure to either a cylinder or a box. The processor 111 is configured to determine which of the plurality of object models has the closest fit for the analyzed portion of the first visual data 306. For example, the processor 111 may assign a score (for example, a recognition accuracy percentage) as to the degree of similarity between a particular object model of the plurality of object models and the analyzed portion of the first visual data 306. For example, the processor 111 may choose the object model of the plurality of object models associated with the highest associated score (e.g., recognition accuracy percentage), as the object model that corresponds to the analyzed portion of the first visual data 306. As such, in one implementation, the processor 111 determines the parameters of the chosen object model.

As described below, the plurality of object models are not fixed. The stored object models and their corresponding parameters may be supplemented or modified. In addition or in the alternative, new category object models may be learned and stored in the database based on the recognized target objects. The discussion at this juncture assumes that the method is detecting the target object 310 for the first time, and objects having similar shapes, structure, or pose information to the target object 310 as a whole are not yet encountered and stored.

Referring to FIG. 3B, an example of the category object recognition of the method is illustrated. For example, the processor 111 may examine the first visual data 306 adjacent to, around, or within the sliding enclosure 312 from left to right, starting from the top left corner of the 2-D image represented by the first visual data 306 moving right thereafter in the direction 314. The processor 111 may recognize objects within the first visual data 306 that are similar in shape or structure to an object model of the plurality of object models stored in the database. In other implementations, instead of the sliding enclosure 312, the visual data set 304, the first visual data 306, the second visual data 308, or combinations thereof may be examined as a whole to determine whether any portion of the first visual data 306 matches an object model stored in the database.

FIG. 3C illustrates a result of the category object recognition. The processor 111 may recognize that the target object 310 is similar to one of the object models. The first enclosure 350 may be a bounding box, a bounding circle, or any other shape without limiting the scope of the invention. The first enclosure 350 has a first center point 316. When the first enclosure 350 is a bounding box, the first center point 316 is the point with approximately equal distance from each side of the bounding box. When the first enclosure 350 is a bounding circle, the first center point 316 may be the center of the bounding circle. In one embodiment, the processor 111 may determine the first center point 316 such that the first center point 316 is positioned on, corresponds to, or falls within a portion of the visual data set 304 corresponding to the target object 310. The target object 310 may, for example, be positioned within, around, or adjacent to the first enclosure 350. The processor 111 determines that a first target data (which is a portion of the first visual data 306) corresponds to the target object 310 to recognize the target object 310.

Although the method described above uses a bottle as an exemplary object, the method may be used to recognize points of interest and other features, such as stairs, empty seats or buildings.

Figure 4:
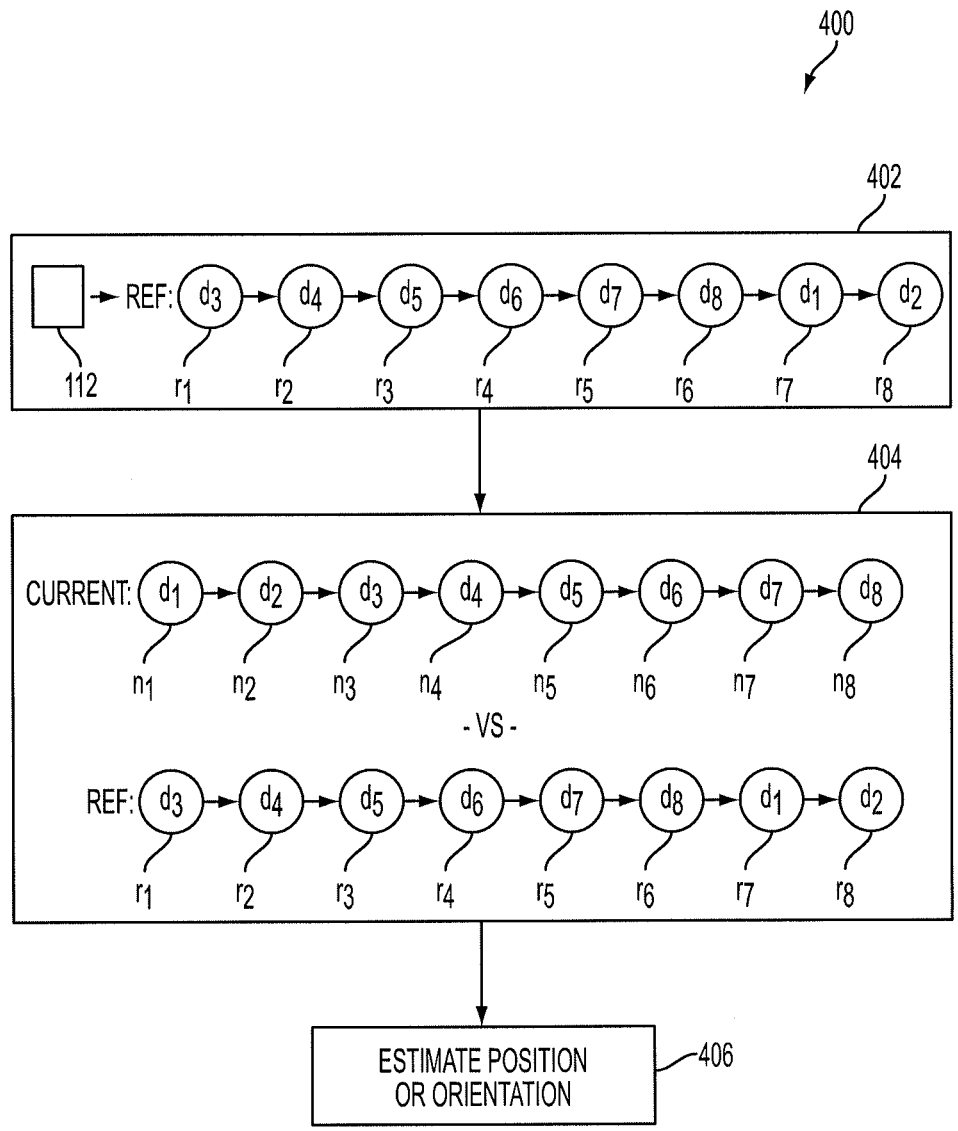
FIG. 4 is a flowchart illustrating a method of estimating a position or orientation based on slice descriptors according to an implementation of the present disclosure.

Referring now to FIG. 4, which shows a flowchart 400 of a method of estimating position or orientation based on slice descriptors. The onboard processing array 110 receives omni-directional image data representative of a panoramic FOV from the stereo cameras 121 and the cameras 122. In some implementations, the stereo cameras 121 and the cameras 122 operate within a physical environment and is configured to acquire omni-directional image data, and to then send the acquired omni-directional image data of the physical environment to the onboard processing array 110 for storage and/or processing. In some implementations, the onboard processing array 110 may receive omnidirectional image data from a source external to the smart necklace 100, such as via the antenna 142. The acquired omni-directional image data may be in the form of digital video and/or one or more digital photographs.

The onboard processing array 110 segments the omni-directional image data into a plurality of image slices. In one exemplary implementation, the received omni-directional image is segmented into eight slices (S1, S2, S3, S4, S5, S6, S7, and S8). In some implementations, the omni-direction image may be segmented into any number of slices. In some implementations, the number of slices may be between 8 and 36. However, it should be understood that the number of slices may be less than 8 or greater than 36.

Each of the plurality of slices is representative of at least a portion of the panoramic field of view of the omni-directional image data or the partially panoramic field of view of the omni-directional image data. In some implementations, the plurality of image slices includes a middle image slice (e.g., slice S2), a preceding image slice (e.g., slice S1), and a subsequent image slice (e.g., slice S3), such that a field of view of the middle image slice (e.g., slice S2) is adjacent to or overlaps a preceding field of view of the preceding image slice (e.g., slice S1) and the middle field of view of the middle image slice (e.g., slice S2) is adjacent to or overlaps a subsequent view of the subsequent image slice (e.g., slice S3).

In some implementations, each image slice of the plurality of image slices is representative of an equal portion of the panoramic field of view of the omni-directional image data and the collective fields of view of the plurality of image slices is the same as the panoramic field of view of the omni-directional image data. For example, each of the eight slices captures an eighth of the full panoramic view of the omnidirectional image data and the collective field of view of the eight image slices is the same as the panoramic field of view of the omni-directional image data. In some implementations, the field of view of a first slice of the plurality of views may be greater than a field of view of a second slice of the plurality of slices. In some implementations, the collective fields of view of the plurality of slices may be smaller than the full panoramic field of view. In some implementations, the field of views of neighboring slices may overlap.

The onboard processing array 110 calculates a slice descriptor for each image slice of the plurality of image slices. As used herein, "slice descriptor" refers to a description of the visual features (e.g., color, texture, shape, motion, etc.) of the image data of a particular slice of the omni-directional image data. For example, a slice descriptor d1 is calculated for slice S1, a slice descriptor d2 is calculated for slice S2, a slice descriptor d3 is calculated for slice S3, a slice descriptor d4 is calculated for slice S4, a slice descriptor d5 is calculated for slice S5, a slice descriptor d6 is calculated for slice S6, a slice descriptor d7 is calculated for slice S7, and a slice descriptor d8 is calculated for slice S8.

In some implementations, the slice descriptor may be calculated using an algorithm, such as scale-invariant feature transform ("SIFT"), speeded up robust feature ("SURF"), histogram of oriented gradients ("HOG"), generalized search tree ("GIST"), fast retina keypoint ("FREAK"), and binary robust invariant scalable keypoints ("BRISK"), and the like. However, it should be understood that other algorithms may be used to calculate the slice descriptor. In some implementations, the slice descriptor may include a decimal vector. In some implementations, the slice descriptor may include a binary vector. In other implementations, the slice descriptor may be represented in a format other a binary vector or a decimal vector. Depth information resulting from the application of stereo algorithms may also be used to calculate the slice descriptor.

The onboard processing array 110 generates a current sequence of slice descriptors for the omni-directional image data received. The current sequence of slice descriptors includes the calculated slice descriptor for each image slice of the plurality of image slices. For example, node n1 includes the slice descriptor d1 corresponding to slice S1, node n2 includes the slice descriptor d2 corresponding to slice S2, node n3 includes the slice descriptor d3 corresponding to slice S3, node n8 includes the slice descriptor d8 corresponding to slice S8, etc.

In some implementations, the current sequence of slice descriptors may be structured such that a middle node (e.g., node n2) corresponds to a middle image slice (e.g., slice S2), a preceding node (e.g., node n1) corresponds to a preceding image slice (e.g., slice S1), and a subsequent node (e.g., node n3) corresponds to a subsequent image slice (e.g., slice S3). The preceding node (e.g., node n1) is linked to the middle node (e.g., node n2), and the middle node (e.g., node n2) is linked to the subsequent node (e.g., node n3).

In some implementations, the current sequence of slice descriptors are stored in the storage 113. In some implementations, the storage 113 may include a database of reference sequences of slice descriptors, each of which corresponds to a previously processed omni-directional image encountered by the onboard processing array 110.

In some implementations, the current sequence of slice descriptors may be stored in the storage 113 as a current linked list of slice descriptors. In implementations in which the current sequence of slice descriptors is stored in the storage 113 as a current linked list of slice descriptors, each node of the linked list may be linked to the subsequent node of the linked list (e.g., node n1 is linked to node n2, node n2 is linked to node n3, etc.). In some implementations, the current sequence of slice descriptors may be stored in the storage 113 as a circular linked list of slice descriptors, such that the first node is linked to the second node (e.g., node n1 is linked to node n2), the second node is linked to the third node (e.g., node n2 is linked to node n3), . . . , and the last node is linked back to the first node (e.g., node n8 is linked to node n1). In some implementations, the current sequence of slice descriptors may be stored in the storage 113 as a current doubly linked list of slice descriptors. It should be understood that in other implementations, the current sequence of slice descriptors may be stored in the storage 113 using a data structure other than a linked list, such as an array, and the like.

While the omni-directional image received was not unwarped prior to segmenting the omni-directional image, in other implementations, the omni-directional image may be unwarped prior to segmentation.

Returning to FIG. 4, at block 402, the machine readable instructions stored in the memory 112, when executed by the processor 111, may cause the onboard processing array 110 to access a reference sequence of slice descriptors in the storage 113. For example, in the implementation depicted in FIG. 4, the reference sequence of slice descriptors includes a reference slice descriptor d3 corresponding to a reference node r1, a reference slice descriptor d4 corresponding to a reference node r2, a reference slice descriptor d5 corresponding to a reference node r3, a reference slice descriptor d6 corresponding to a reference node r4, a reference slice descriptor d7 corresponding to a reference node r5, a reference slice descriptor d8 corresponding to a reference node r6, a reference slice descriptor d1 corresponding to a reference node r7, and a reference slice descriptor d2 corresponding to a reference node r8.

Still referring to FIG. 4, at block 404, the machine readable instructions stored in the memory 112, when executed by the processor 111, may cause the onboard processing array 110 to determine whether the current sequence of slice descriptors matches the reference sequence. In some implementations, whether the current sequence of slice descriptors matches the reference sequence of slice descriptors is determined by determining a current order of slice descriptors, determining a reference order of slice descriptors, and comparing the current order of slice descriptors to the reference order of slice descriptors. For example, a current order of slice descriptors in the embodiment depicted in FIG. 4 may be determined as {d1, d2, d3, d4, d5, d6, d7, d8}. A reference order of slice descriptors in the embodiment depicted in FIG. 4 may be determined as {d3, d4, d5, d6, d7, d8, d1, d2}. The current order of slice descriptors {d1, d2, d3, d4, d5, d6, d7, d8} may be compared to the reference order of slice descriptors {d3, d4, d5, d6, d7, d8, d1, d2} in order to determine whether the current order of slice descriptors matches the reference order of slice descriptors.

In some implementations, the current sequence of slice descriptors is a current circular linked list of slice descriptors and the reference sequence of slice descriptors is a reference circular linked list of slice descriptors. In such implementations, the current order of slice descriptors may be determined by traversing the current circular linked list of slice descriptors starting at a current starting node (e.g., the current order of slice descriptors may be determined to be {d1, d2, d3, d4, d5, d6, d7, d8} by traversing the current circular linked list starting from node n1 of the current circular linked list of slice descriptors). The reference order of slice descriptors may be determined by traversing the reference circular linked list of slice descriptors starting at a reference starting node (e.g., the reference order of slice descriptors may also be determined to be {d1, d2, d3, d4, d5, d6, d7, d8} by traversing the reference circular linked list starting from node r7 of the reference circular linked list of slice descriptors). The current sequence of slice descriptors matches the reference sequence of slice descriptors when the current order of slice descriptors is the same as the reference order of slice descriptors. In the embodiment depicted in FIG. 4, the current sequence of slice descriptors may be determined to match the reference sequence of slice descriptors because the reference order of slice descriptors when traversing the reference circular linked list of slice descriptors starting from node r7 is the same as the current order of slice descriptors when traversing the current circular linked list of slice descriptors starting from node n1.

Still referring to FIG. 4, at block 406, the machine readable instructions stored in the memory 112, when executed by the processor 111, may cause the onboard processing array 110 to estimate an orientation or position based on the current sequence of slice descriptors and the reference sequence of slice descriptors. For example, differences between the current sequence of slice descriptors and the reference sequence of slice descriptors may be used to determine a current position or orientation with reference to a known position or orientation associated with the reference sequence of slice descriptors. In some implementations, standard filtering techniques, such as the extended Kalman filter, the particle filter, and the like may be used to determine the current position or orientation based on the comparison between the current sequence of slice descriptors and the reference sequence of slice descriptors.

FIGS. 5A-9 illustrate various possible exemplary implementations of the smart necklace 100. Although FIGS. 5A-9 depict specific locations of components, in other implementations the exact locations and configurations may vary, as more or less components may be added or rearranged depending on specific applications. For example, the onboard processing array 110 may generally be located in the band portion of the smart necklace. Other hidden components, such as the IMU 123, the GPS 124, the sensor 125, the vibration unit 133, the battery 141, and the antenna 142, may be placed along the inside of the smart necklace as needed. The use of specialized sensors may require specific sensor placement and rearrangement of the other components. In addition, although the various implementations described generally take on a U-shape, in other implementations, other shapes, such as an O-shape or Ω-shape, may be used.

Figure 5B:
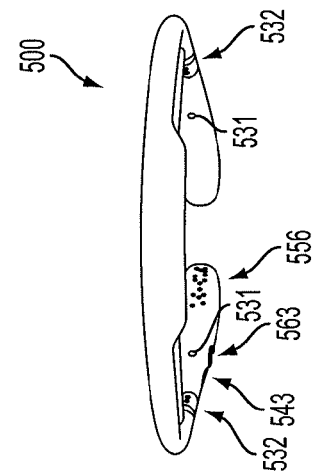
FIG. 5B is a side view of the smart necklace in FIG. 5A.
Figure 5C:
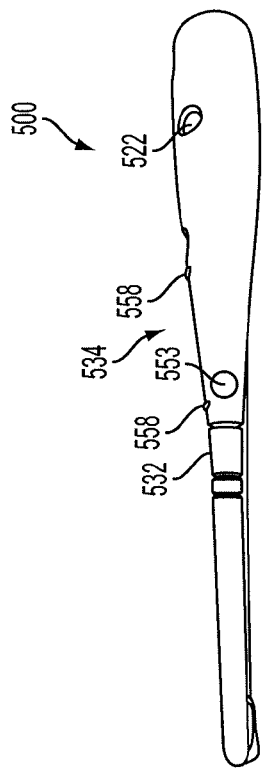
FIG. 5C is a back view of the smart necklace in FIG. 5A.
Figure 5A:
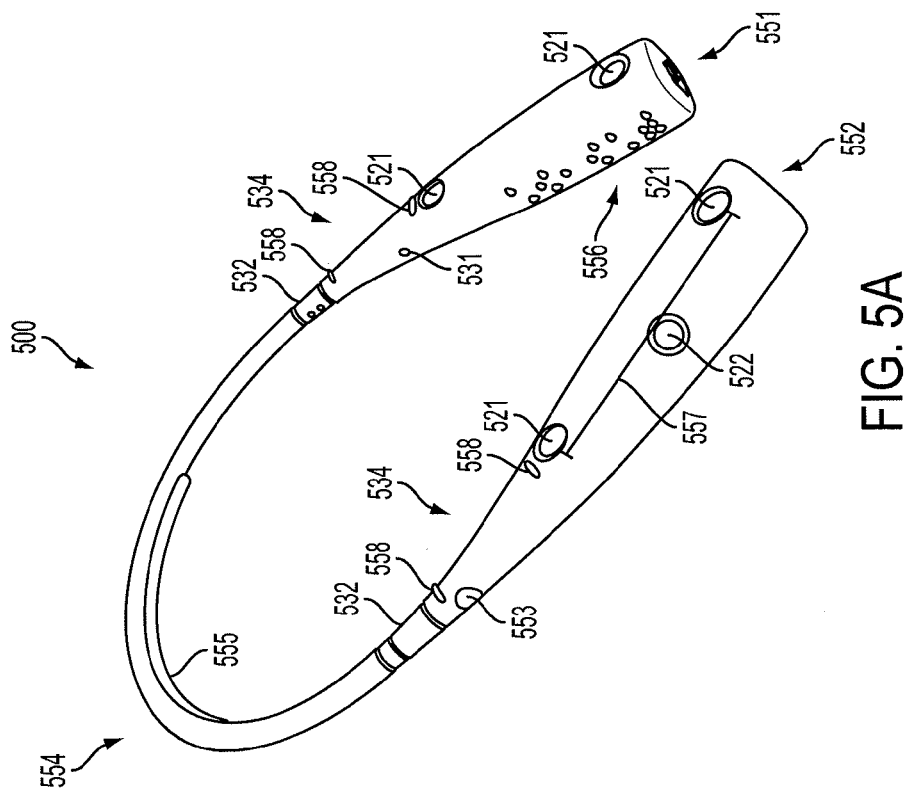
FIG. 5A is a view of a smart necklace with a "stalk" design according to an implementation of the present disclosure.

Turning to FIGS. 5A-5C, FIGS. 5A-5C depict one implementation of a smart necklace 500 having a "stalk" design. The smart necklace 500 has a left stalk 551 and a right stalk 552, connected by a tube 554, which may be a flexible tube for added comfort. The smart necklace 500 corresponds to the smart necklace 100, and has similar components as the smart necklace 100, which are located within the left stalk 551, the right stalk 552, and the tube 554. Specifically, the tube 554 defines a cavity which houses the unseen components of the smart necklace 500. The left stalk 551 and the right stalk 552 each have a pair of stereo cameras 521, which may be offset by a stereo distance 557. Although in FIG. 5A the stereo distance 557 is the same for both pairs of stereo cameras 521, in other implementations the stereo distance 557 may be different for each pair of stereo cameras 521. Cameras 522 are placed to the sides of the stereo cameras 521 to increase the FOV. Speakers 532 are placed above the left stalk 551 and the right stalk 552. A microphone 531 is placed away from the speakers 532. A button 553 may be used as a power button or on/off switch, or other input. A touch sensor 534, which may be delimited with bump indicators 558, may provide another input for the user. A headphone jack 543 provides a port for attaching, for example, a 3.5 mm headphone set. A data port 563 may provide an additional port for data connections. The headphone jack 543 and the data port 563 may be located on the underside of the smart necklace 500, as seen in FIG. 5C. A texture strip 555, which may be rubber or silicone, lines the tube 554 to provide added cushioning and grip. In addition, the smart necklace 500 may have braille 556 for identification or a label for blind persons.

Figure 6B:
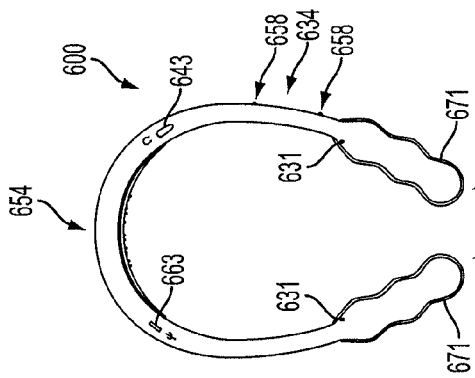
FIG. 6B is an under-side view of the smart necklace in FIG. 6A.
Figure 6C:
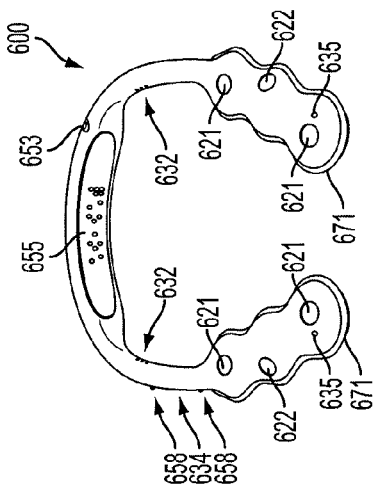
FIG. 6C is another view of the smart necklace in FIG. 6A.
Figure 6A:
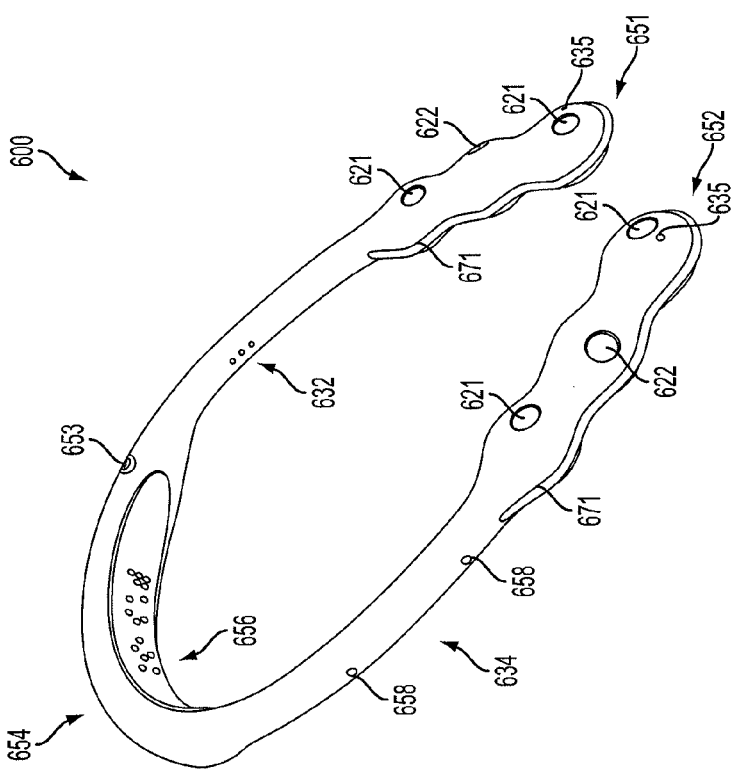
FIG. 6A is a view of a smart necklace with a "pod" design according to an implementation of the present disclosure.

Referring now to FIGS. 6A-6C, FIGS. 6A-6C depict one implementation of a smart necklace 600 having a "pod" design, which may resemble two peapods connected by a band. The smart necklace 600 has a left pod 651 and a right pod 652, connected by a band 654, which may be a flexible band for added comfort. The smart necklace 600 corresponds to the smart necklace 100, and has similar components as the smart necklace 100, which are located within the left pod 651, the right pod 652, and the band 654. Specifically, the band 654 defines a cavity which houses the unseen components of the smart necklace 500. The left pod 651 and the right pod 652 each have a pair of stereo cameras 621. Cameras 622 are placed to the sides of the stereo cameras 621 to increase the FOV. Each of the stereo cameras 621 and cameras 622 may be placed on its own "pea," as seen in the three peas in FIGS. 6A and 6C. In other implementations, more or less peas may be used to house additional cameras or sensors. In certain other implementations, one or more of the peas may be removable and modular, to create custom combinations of sensors. For example, additional peas may be screwed on, magnetically attached, or otherwise removably attached, with electrical connector points between adjacent peas for sending power and signals. Speakers 632 are placed above the left pod 651 and the right pod 652. Microphones 631 are placed behind the left pod 651 and the right pod 652 and away from the speakers 632, as seen in FIG. 6B. A headphone jack 643, which may be located on an underside of the smart necklace 600, provides a port for attaching, for example, a 3.5 mm headphone set. A data port 663, which may be a universal serial bus (USB) port or other similar data port, provides an additional data connection to other devices. A touch sensor 634, which may be delimited with bump indicators 658, may provide another input for the user. A button 653 may be used as a power button or on/off switch, or other input. A texture strip 655, which may be rubber or silicone, lines the band 654 to provide added cushioning and grip. In addition, the smart necklace 600 may have braille 656 for identification or a label for blind persons. LEDs 635, placed near the bottom of the left pod 651 and the right pod 652, provide visual indicators, such as status indicators, and may have different colors or flashing patterns to indicate various statuses. An overmold 671, which may be rubber or silicone, lines each of the left pod 651 and the right pod 652, and may be soft and flexible to provide additional grip and cushioning.

Figure 7B:
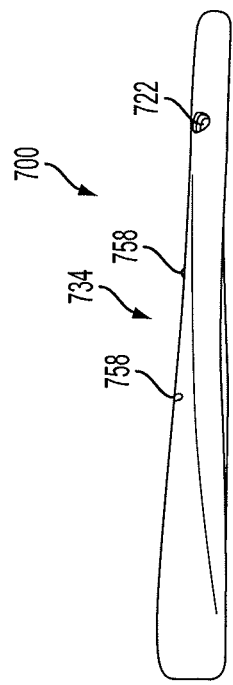
FIG. 7B is a side view of the smart necklace in FIG. 7A.
Figure 7A:
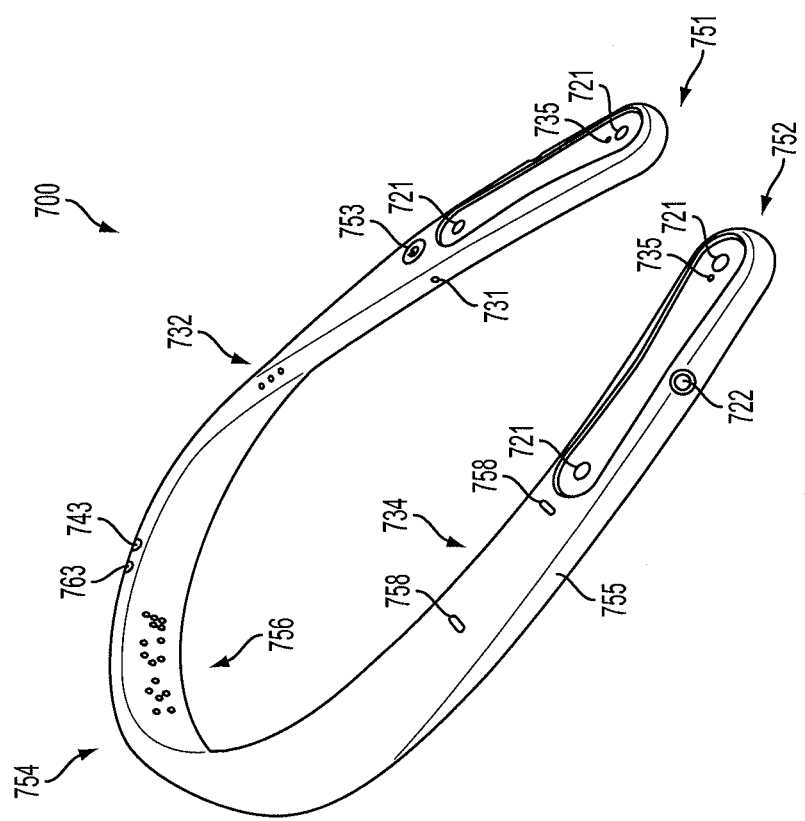
FIG. 7A is a view of a smart necklace with a "paddle" design according to an implementation of the present disclosure.

FIGS. 7A-7B depict one implementation of a smart necklace 700 having a "paddle" design, which may resemble two paddles connected by a band. The smart necklace 700 has a left paddle 751 and a right paddle 752, connected by a band 754, which may be a flexible band for added comfort. The smart necklace 700 corresponds to the smart necklace 100, and has similar components as the smart necklace 100, which are located within the left paddle 751, the right paddle 752, and the band 754. Specifically, the band 754 defines a cavity which houses the unseen components of the smart necklace 500. The left paddle 751 and the right paddle 752 each have a pair of stereo cameras 721. Cameras 722 are placed to the sides of the stereo cameras 721 to increase the FOV. Speakers 732 are placed above the left paddle 751 and the right paddle 752. Microphones 731 are placed on the sides of the left paddle 751 and the right paddle 752 and towards the inside of the U-shape of the smart necklace 700, as seen in FIG. 7A. A headphone jack 743 provides a port for attaching, for example, a 3.5 mm headphone set. A data port 763 may provide an additional port for data connections. A touch sensor 734, which may be delimited with bump indicators 758, may provide another input for the user. A button 753 may be used as a power button or on/off switch, or other input. An overmold 755, which may be rubber or silicone, may line a portion or a majority of the smart necklace 700 to provide added cushioning and grip. In addition, the smart necklace 700 may have braille 756 for identification or a label for blind persons. LEDs 735, placed near the bottom of the left paddle 751 and the right paddle 752, provide visual indicators, such as status indicators, and may have different colors or flashing patterns to indicate various statuses.

FIGS. 7C-7D illustrate a smart necklace 701, which is similar to the smart necklace 700 with a modified paddle design. A modified paddle 780, which may be either a right paddle or a left paddle or both, has the overmold 755, but narrows at a neck portion 785. The modified paddle 780 is configured to have removable pucks, such as a left puck 781 and a right puck 782 in FIG. 7D. The overmold 755 has a large, oblong puck opening 783 for housing the left puck 781 or the right puck 782. The overmold 755 further includes a side opening 784 to allow the camera 722 to have a side view. The left puck 781 and the right puck 782 may be removed from the overmold 755 through the puck opening 783. In other implementations, the left puck 781 and the right puck 782 may be slid out of an additional hole in the overmold 755, or other similar method as needed. For example, in other implementations the left puck 781 and the right puck 782 may be magnetically attachable, and may further be connected by a retractable tether. The neck portion 785 may contain a connection port for the left puck 781 and the right puck 782 to send signals to and from the smart necklace 700, and to receive power. The left puck 781 and the right puck 782 may further include its own battery, respectively.

In FIG. 7D, the left puck 781 has stereo cameras 721 separated by a stereo distance 757. The right puck 782 has the same stereo distance 757. However, in other implementations the stereo distance 757 may be different. In yet other implementations, the stereo distance 757 may be variable, giving the user the option to remove the left puck 781 and focus on a smaller object, or to get a wider view. For example, the user may wish to have more information about a specific item. By placing the left puck 781 near the item, the stereo cameras 721 may be better able to detect finer details and provide isolated object recognition to provide the user more descriptive information. In certain other implementations, the left puck 781 and/or the right puck 782 may have other sensors, such that the pucks are interchangeable with cameras or sensors as needed in a particular application.

Figure 8:
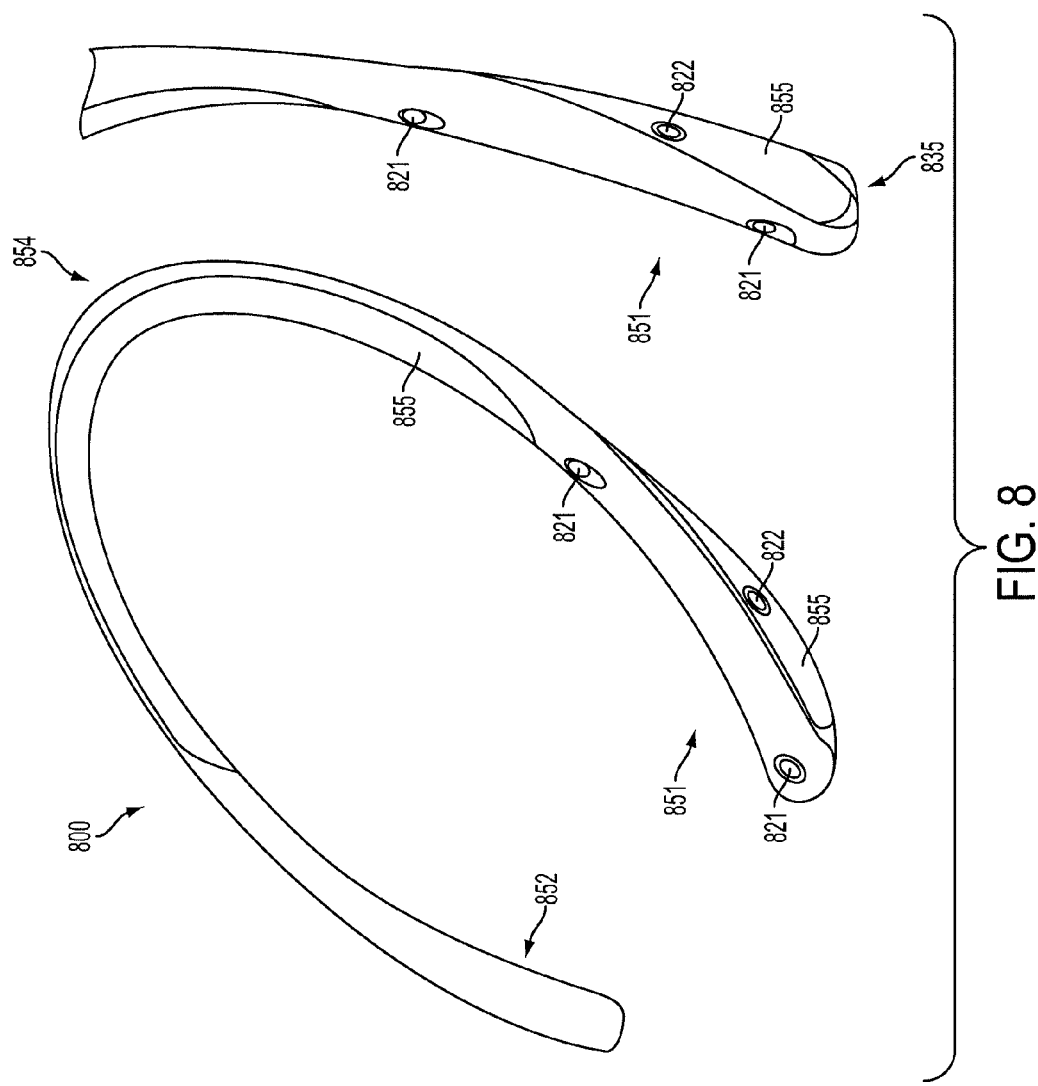
FIG. 8 is a view of a smart necklace with a "twist" design according to an implementation of the present disclosure.

Turning now to FIG. 8, FIG. 8 depicts one implementation of a smart necklace 800 having a "twist" design, which may resemble a twisted band or tube. The smart necklace 800 has a left prong 851 and a right prong 852, connected by a band 854, which may be a flexible band for added comfort. The smart necklace 800 corresponds to the smart necklace 100, and has similar components as the smart necklace 100, which are located within the left prong 851, the right prong 852, and the band 854. The left prong 851 and the right prong 852 each have a pair of stereo cameras 821. Cameras 822 are placed to the sides of the stereo cameras 821 to increase the FOV. An overmold 855, which may be rubber or silicone, may line a portion or a majority of the smart necklace 800 to provide added cushioning and grip. As seen in FIG. 8, the overmold 855 twists around the smart necklace 800, starting from the left prong 851 and twisting around the band 854. An LED 835, placed near the bottom of at least the left prong 851, provides a visual indicator, such as a status indicator, and may have different colors or flashing patterns to indicate various statuses.

Figure 9:
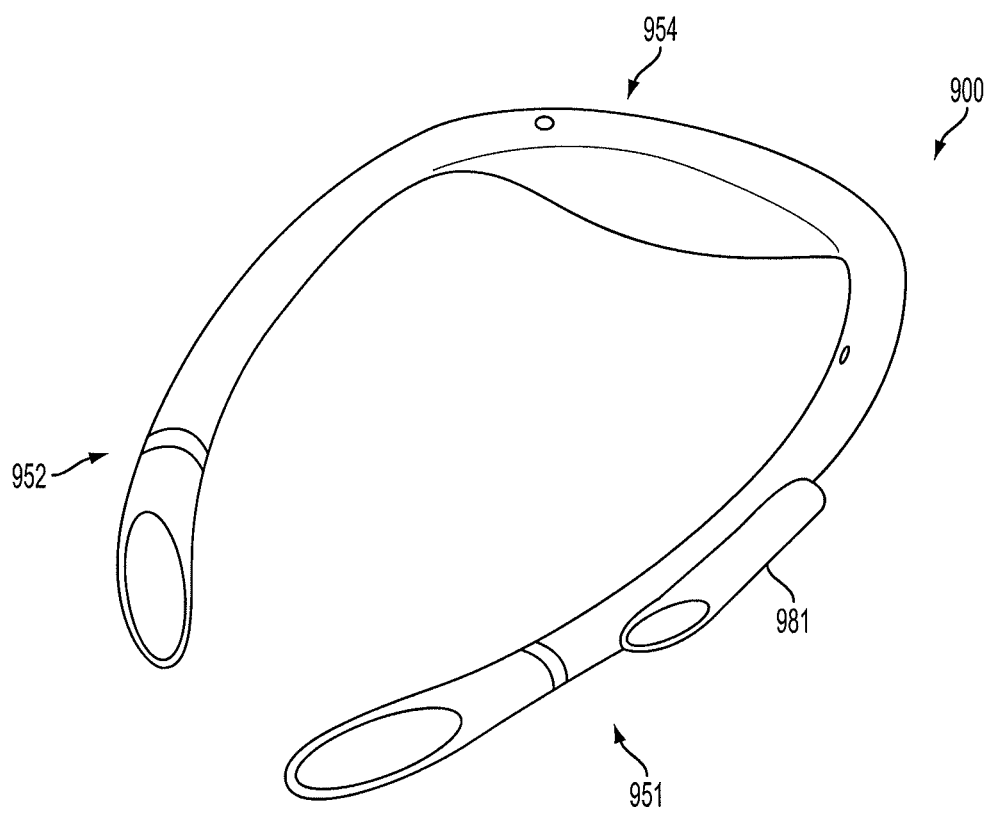
FIG. 9 is a view of a smart necklace with a removable tube having a camera according to an implementation of the present disclosure.

Turning now to FIG. 9, FIG. 9 depicts one implementation of a smart necklace 900 having a removable tube 981 with a camera, according to an implementation of the present disclosure. The smart necklace 900 corresponds to the smart necklace 100, and has similar components as the smart necklace 100, which are located within the left portion 951, the right portion 952, and the band 954. The left portion 951 and the right portion 952 may each have a pair of stereo cameras (not shown) similarly as discussed above with respect to FIGS. 5A-8. In one embodiment, the smart necklace 900 may include input devices (e.g., a microphone), output devices (e.g., a speaker and/or haptic feedback), other units, or combinations thereof as described above with respect to embodiments shown in FIGS. 5A-8. Similar to the embodiments described above with respect to FIGS. 7A-7D, a removable tube 981 may be equipped with a camera. For example, the removable tube 981 may be magnetically attachable; attachable with a clip; connected by a retractable tether, wire or cable; or combinations thereof. For example, the user may wish to have more information about a specific item. By placing the camera of the removable tube 981 near the item, the smart necklace 900 may be better able to detect finer details and provide isolated object recognition to provide the user more descriptive information. In other embodiments, removable tubes 981 may be provided on the right portion 952 or both portions 951 and 952, or other portions of the smart necklace 900. In addition to or instead of the removable tube 981, other removable cameras may be provided using various other attaching mechanisms based on practical design and aesthetic concerns in order to allow the user to enhance detection of information.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device, point of sale device, personal digital assistant (e.g., an Android device, iPhone®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Systems, methods and computer program products are provided. References to "various embodiments", in "some embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The steps of a method or algorithm described in connection with the examples disclosed herein may be embodied directly in hardware, in a software module executed by the processor 111, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium, such as the storage 113, is coupled to the processor 111 such that the processor 111 can read information from, and write information to, the storage medium. In the alternative, the storage medium may be integral to the processor 111. The processor 111 and the storage medium may reside in an Application Specific Integrated Circuit (ASIC).

The methods/systems may be described herein in terms of functional block components, screen shots, optional selections and various processing steps. It should be appreciated that such functional blocks may be realized by any number of hardware and/or software components configured to perform the specified functions. For example, the methods/systems may employ various integrated circuit components, e.g., memory elements, processing elements, logic elements, look-up tables, and the like, which may carry out a variety of functions under the control of one or more microprocessors or other control devices. Similarly, the software elements of the methods/systems may be implemented with any programming or scripting language such as, VPL, C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and XML with the various algorithms being implemented with any combination of data structures, objects, processes, routines or other programming elements. Further, it should be noted that the methods/systems may employ any number of conventional techniques for data transmission, signaling, data processing, network control, and the like.

As will be appreciated by one of ordinary skill in the art, the methods/systems may be embodied as a customization of an existing system, an add-on product, upgraded software, a stand-alone system, a distributed system, a method, a data processing system, a device for data processing, and/or a computer program product. Furthermore, the methods/systems may take the form of a computer program product on a non-transitory computer-readable storage medium having computer-readable program code means embodied in the storage medium. Any suitable computer-readable storage medium may be utilized, including hard disks, CD-ROM, optical storage devices, magnetic storage devices, and/or the like.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable neck device for providing environmental awareness to a user, comprising:
   a flexible tube for being worn around a neck of the user, defining a cavity, having a U-shape, and having a center portion configured to rest on a back of a neck of the user, a left portion and a right portion;
   a first stereo pair of cameras positioned on the left portion of the flexible tube;
   a second stereo pair of cameras positioned on the right portion of the flexible tube;
   an inertial measurement unit (IMU) positioned within the cavity and configured to detect inertial measurement data;
   a vibration unit positioned within the cavity and configured to provide haptic feedback to the user;
   a speaker positioned along the flexible tube and configured to provide audio feedback to the user; and
   a processor positioned within the cavity and configured to receive video frames from the first stereo pair of cameras and the second stereo pair of cameras, receive the detected inertial measurement data from the IMU, provide object recognition of items in the video frames, identify points of interest to the user based on the object recognition, determine navigation instructions based on the inertial measurement data and the received video frames, and control the vibration unit to provide haptic feedback and the speaker to provide audio feedback to the user based on the points of interest and the navigation instructions.

2. The wearable neck device of claim 1 further comprising a storage device configured to store a map data.

3. The wearable neck device of claim 1 further comprising an antenna configured for wireless communication.

4. The wearable neck device of claim 1 further comprising at least one of a radio frequency identification (RFID) reader for reading RFID tags or a near field communication (NFC) unit for reading NFC tags.

5. The wearable neck device of claim 1 further comprising a global position system (GPS) unit positioned in the cavity and configured to detect location data and wherein the processor is further configured to determine the navigation instructions based on the location data.

6. The wearable neck device of claim 1 further comprising a microphone for receiving voice commands.

7. The wearable neck device of claim 1 further comprising a battery capable of being wirelessly charged.

8. The wearable neck device of claim 1 further comprising an input device for adjusting parameters for haptic and audio feedback.

9. The wearable neck device of claim 1 further comprising at least one of a fifth camera positioned on the left portion of the flexible tube or a sixth camera positioned on the right portion of the flexible tube, the at least one of the fifth camera or the sixth camera being configured to increase a field of view for the wearable neck device.

10. The wearable neck device of claim 1 wherein the first stereo pair of cameras is removable from the left portion of the flexible tube and the second stereo pair of cameras is removable from the right portion of the flexible tube.

11. The wearable neck device of claim 1 wherein the first stereo pair of cameras is coupled to the flexible tube using at least one of a retractable tether, a string or a cable.

12. The wearable neck device of claim 10 wherein at least one of the first stereo pair of cameras or the second stereo pair of cameras are capable of isolated object recognition when placed near an item.

13. The wearable neck device of claim 1 further comprising a removable tube having a fifth camera, the removable tube being coupled to at least one of the left portion or the right portion using at least one of a magnetic attachment; a clip; a retractable tether, a string or a cable, wherein the fifth camera is capable of isolated object recognition when placed near an item.

14. A wearable neck device for providing environmental awareness to a user, comprising:
   a band defining a cavity and having a center portion, a left portion and a right portion;
   a first stereo pair of cameras positioned on the left portion of the band;
   a first camera positioned to a side of the first stereo pair of cameras;
   a second stereo pair of cameras positioned on the right portion of the band;
   a second camera positioned to a side of the second stereo pair of cameras;
   an inertial measurement unit (IMU) coupled to the band and configured to detect inertial measurement data;
   a vibration unit positioned within the cavity and configured to provide haptic feedback to the user;
   a speaker positioned along the band and configured to provide audio feedback to the user; and
   a processor positioned within the cavity and configured to receive video frames from the first stereo pair of cameras, the first camera, the second stereo pair of cameras and the second camera, receive the inertial measurement data from the IMU, provide object recognition of items in the video frames, identify points of interest to the user based on the object recognition, determine navigation instructions based on the inertial measurement data and the video frames, and control the vibration unit to provide haptic feedback and the speaker to control the speaker to provide audio feedback to the user based on the items of interest and the navigation instructions.

15. The wearable neck device of claim 14 further comprising an overmold covering at least a portion of the band to provide cushioning and grip.

16. The wearable neck device of claim 14, further comprising:
   a storage device configured to store a map data, and
   a global position system (GPS) unit coupled to the band and configured to detect location data,
   wherein the processor is further configured to determine the navigation instructions based on the location data.

17. The wearable neck device of claim 14 further comprising an antenna configured for wireless communication.

18. The wearable neck device of claim 14 wherein the first stereo pair of cameras is removable from the left portion of the band and the second stereo pair of cameras is removable from the right portion of the band to provide isolated object recognition when the first stereo pair of cameras or the second stereo pair of cameras is placed near an item.

* * * * *